United States Patent
Paulsen et al.

(10) Patent No.: US 6,660,432 B2
(45) Date of Patent: Dec. 9, 2003

(54) LITHIATED OXIDE MATERIALS AND METHODS OF MANUFACTURE

(75) Inventors: Jens Martin Paulsen, Manukau (NZ); Loan Yen Kieu, Mount Wellington (NZ); Brett Graeme Ammundsen, Arch Hill (NZ)

(73) Assignee: Ilion Technology Corporation, New York, NY (US)

( * ) Notice: Subject to any disclaimer, the term of this patent is extended or adjusted under 35 U.S.C. 154(b) by 208 days.

(21) Appl. No.: 09/799,935

(22) Filed: Mar. 6, 2001

(65) Prior Publication Data

US 2003/0022063 A1 Jan. 30, 2003

Related U.S. Application Data

(60) Provisional application No. 60/232,551, filed on Sep. 14, 2000.

(51) Int. Cl.[7] .......................... H01M 4/48; H01M 4/50; H01M 4/52
(52) U.S. Cl. ...................... 429/231.3; 429/218.1; 429/223; 429/224; 423/596
(58) Field of Search ............... 429/218.1, 224, 429/223, 231.3; 423/596, 599

(56) References Cited

U.S. PATENT DOCUMENTS

| | | | |
|---|---|---|---|
| 5,264,201 A | 11/1993 | Dahn et al. | 423/594 |
| 5,370,948 A | 12/1994 | Hasegawa | 428/223 |
| 5,393,622 A | 2/1995 | Nitta et al. | 429/223 |
| 5,626,635 A | 5/1997 | Yamamura et al. | 29/623.5 |
| 5,750,288 A | 5/1998 | Xie et al. | 429/229 |
| 6,040,090 A | 3/2000 | Sunagawa et al. | 429/231.95 |
| 6,045,771 A | 4/2000 | Matsubara et al. | 423/593 |
| 6,193,946 B1 * | 2/2001 | Kawano et al. | 423/594.4 |
| 6,361,756 B1 * | 3/2002 | Gao et al. | 423/599 |

FOREIGN PATENT DOCUMENTS

| | | | |
|---|---|---|---|
| EP | 0 782 206 | 7/1997 | |
| EP | 0 918 041 | 5/1999 | |
| EP | 0 944 125 | 9/1999 | |
| EP | 944125 A1 * | 9/1999 | H01M/04/48 |
| JP | 5 198 301 | 8/1993 | |
| JP | 5 283 076 | 10/1993 | |
| JP | 7 37576 | 2/1995 | |
| JP | 11 307 094 | 11/1999 | |

OTHER PUBLICATIONS

Publication entitled "Solid State Ionics," Vol 44, 1990, pp 87–97, "Structure and Electrochemistry of $Li_{\pm y}NiO_2$ and a New $Li_2NiO_2$ Phase With The $Ni(OH)_2$ Structure," by J.R. Dahn, U. von Sacken and C.A. Michal.

Publication entitled "Solid State Ionics," Vol 69, 1994, pp 265–270, "Thermal Stability of $Li_xCoO_2$, $Li_xNiO_2$ and $\lambda-MnO_2$ and Consequences for the Safety of Li–ion cells," J.R. Dahn, E.W. Fuller, M. Obrovac and U. von Sacken.

(List continued on next page.)

Primary Examiner—Carol Chaney
(74) Attorney, Agent, or Firm—Factor & Partners

(57) ABSTRACT

A single phase cathodic material for use in an electrochemical cell represented by the formula:

$$Li[Li_xCo_yA_{1-x-y}]O_2$$

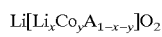

wherein $A=[Mn_zNi_{1-z}]$; wherein x is a numerical value ranging from approximately 0.00 to approximately 0.16; wherein y is a numerical value ranging from approximately 0.1 to approximately 0.30; wherein z is a numerical value ranging from approximately 0.40 to approximately 0.65; and wherein $Li_x$ is included in transition metal layers of the structure and/or wherein the material comprises a layered R-3m crystal structure having a c/a ratio greater than approximately 1.012.

39 Claims, 9 Drawing Sheets

OTHER PUBLICATIONS

Publication entitled "Solid State Ionics," Vol 57, 1992, pp 311–318, "Structure and Electrochemistry of $Li_xMn_yNi_{1-y}O_2$," by J.R. Dahn, C.D.W. Jones, and E Rossen.

Publication entitled "Solid State Ionics," Vol 109, 1998, pp 295–302, "Thermal Behavior of $Li_{1-y}NiO_2$ and the Decomposition Mechanism," by Hajime Arai, Shitgeto Okada, Yoji Sakurai, and Jun–ichi Yamaki.

Abstract 43, Proceedings of the 195$^{th}$ Meeting of the Electrochemical Society, Seattle, Washington, USA, May 26, 1999, by J.R. Dahn and J.M. Paulsen.

Publication entitled "Electrochemical and Solid–State Letters," Vol 1, 1998, pp 117–119, "Novel $LiNi_{1-x}Ti_{x/2}Mg_{x/2}O_2$ Compounds as Cathode Materials for Safer Lithium–Ion Batteries" by Yuan Gao, M.V. Yakovleva, and W.B. Ebner.

Publication entitled "Journal of the Electrochemical Society," Vol 142, No. 12, Dec. 1995, "Synthesis and Characterization of $LiAl_{1/4}Ni_{3/4}/O_2$ (R3m) for Lithium–Ion (Shuttlecock) Batteries," by Tsutomu Ohziku, Atsushi Ueda, and Masaru Kouguchi.

Publication entitled "Journal of Power Sources," Vol 43–44, pp 595–602, 1993, "The Cycling Properties of the $Li_xNi_{1-y}Co_yO_2$ Electrode" by C. Delmas, I. Saadoune and A. Rougier.

\* cited by examiner

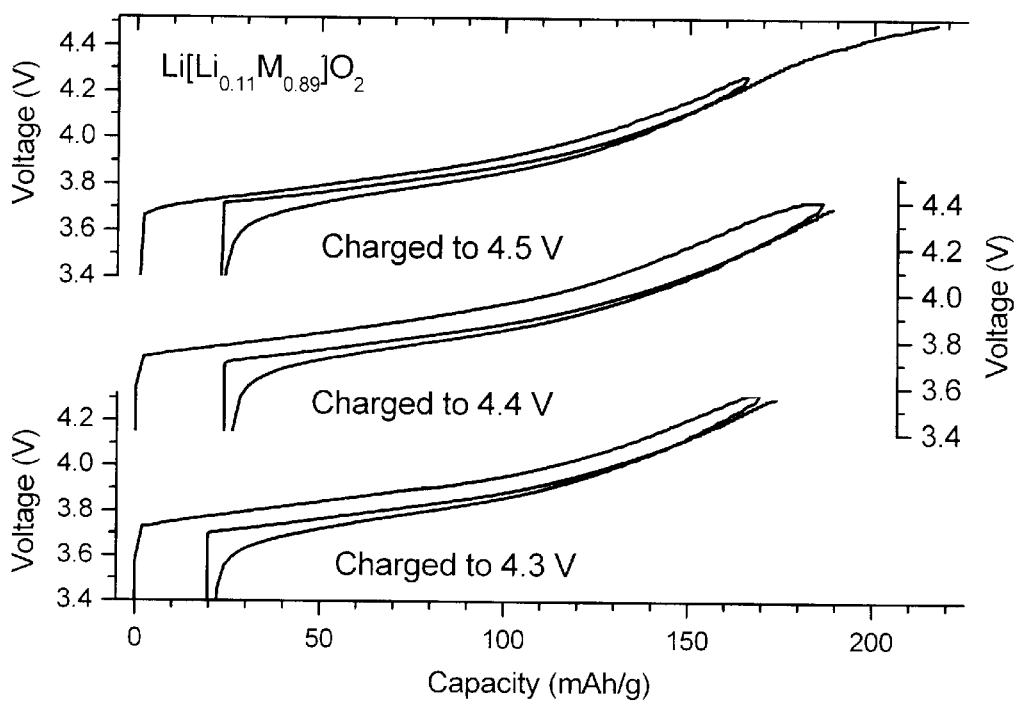
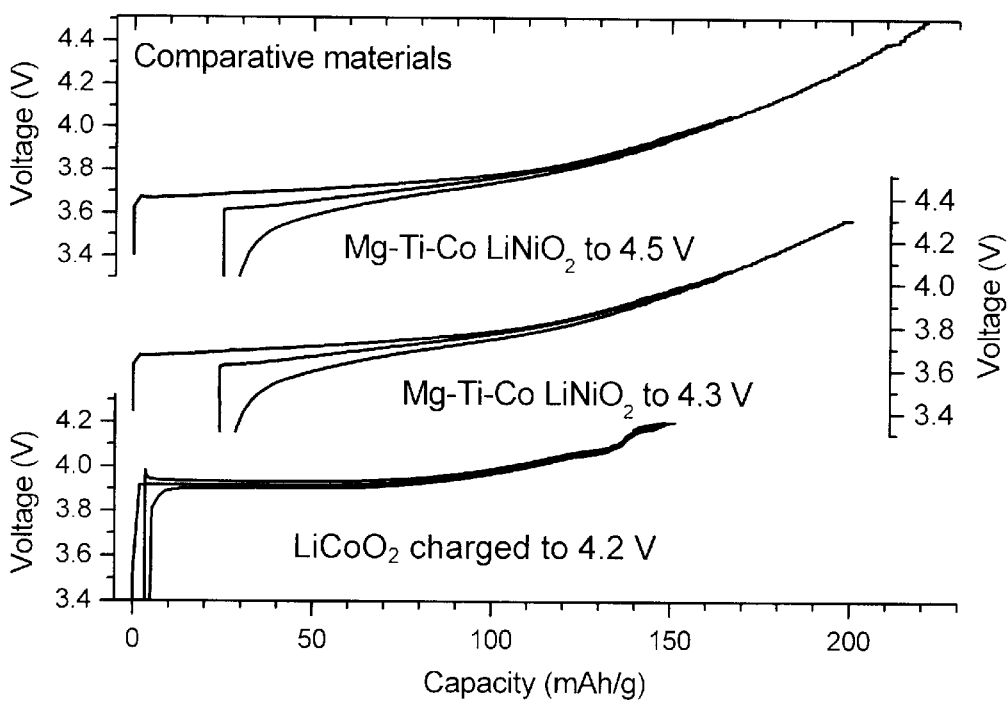
Fig. 8)

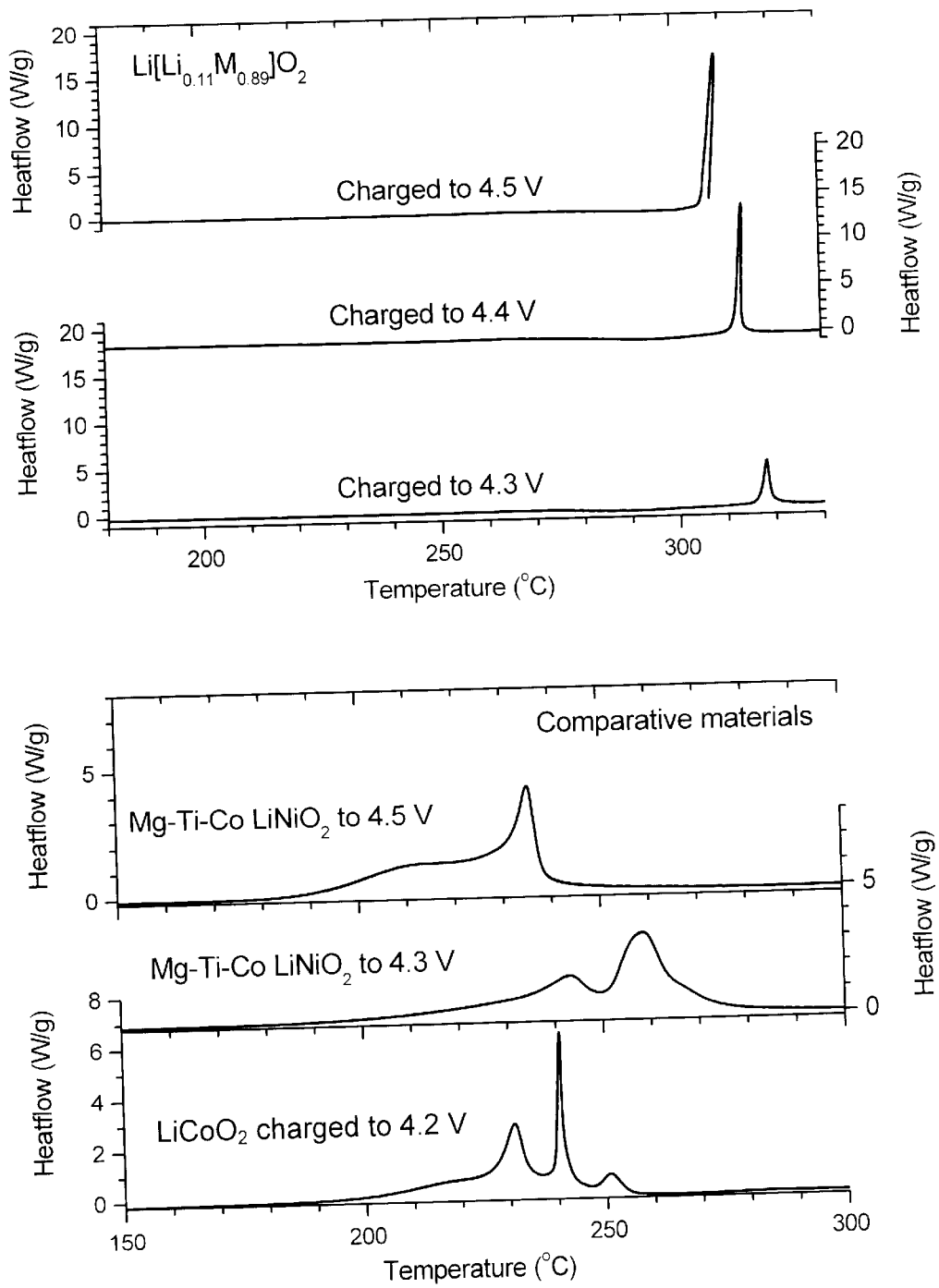
Fig. 9)

LITHIATED OXIDE MATERIALS AND METHODS OF MANUFACTURE

This application claims the benefit of Provisional Application No. 60/232,551, filed Sep. 14, 2000.

BACKGROUND OF THE INVENTION

1. Field of the Invention

This invention relates to lithiated oxides with a well-layered crystal structure for use as cathode materials, and methods of manufacturing such materials.

2. Background Art

Rechargeable lithium batteries are of commercial interest due to their high energy and power density, and their long cycle life. Lithium ion batteries (i.e. batteries which do not use metallic lithium as the anode) have replaced lithium batteries since extended cycling using lithium metal as the anode is problematic. The majority of rechargeable lithium ion batteries use anode materials, which do not contain lithium metal, for example carbon or tin containing materials. This has resulted in the requirement that cathodes must contain lithium which can be extracted during first charge, as well as cycle well over several hundreds of charge-discharge cycles. Prior to the introduction of lithium ion batteries, all materials which cycled well, including sulfides, were candidates for cathodes. Since the introduction of Li-ion batteries the choice of materials has in practice drastically reduced.

Most interesting as cathodes for rechargeable lithium ion batteries are lithium transition metal oxides such as spinel $Li_{1+x}Mn_{2-x}O_4$ (and its modifications) and $LiCoO_2$. Spinel $Li_{1+x}Mn_{2-x}O_4$ is low cost and does not contain hazardous materials. However, its applications are limited since the capacity of materials which cycle well is only around 115 mAh/g. Additionally, the capacity retention during cycling at elevated temperatures (if cycled at 55° C. for example) is not sufficient. $LiCoO_2$ cycles well, and has a capacity of approximately 140 mAh/g, however Co is toxic and expensive. Promising alternatives to $Li_{1+x}Mn_{2-x}O_4$ and $LiCoO_2$ are $LiNiO_2$-based materials. Nickel is less toxic and less costly than Co. Furthermore, in cells $LiNiO_2$ has a larger reversible capacity than $LiCoO_2$.

$LiNiO_2$ and $LiCoO_2$ are layered materials having the alpha-$NaFeO_2$ type structure (space group R-3m). Layered materials are of interest for cathodes since a layered structure provides for the fast diffusion of lithium. In this structure, layers of transition metal octahedrally surrounded by oxygen (leading to $MO_2$ sheets) are separated by lithium cations in the lithium layers. The formula can be written as $LiMO_2$. In this document the formula will often be written as $Li[M]O_2$, or as $\{LiM\}[M]O_2$, where [M] stands for all cations residing in the transition metal layers, and $\{M\}$ stands for non-lithium cations in the lithium layers. In many prior art $LiNiO_2$-based materials, the lithium layers are partially filled by transition metal ions. An example is nickel rich $LiNiO_2$ which can be written as $\{Li_{0.9}Ni_{0.1}\}[Ni]O_2$. Especially promising for cathode applications are well-layered materials, i.e. materials which have little or no transition metal M located on lithium sites. Such well ordered structures provide for fast lithium intercalation and de-intercalation.

It is difficult to prepare $LiNiO_2$ with an acceptable capacity retention during extended cycling. $LiNiO_2$ materials also generally suffer from some irreversible capacity loss in the first cycle, i.e. less lithium can be reinserted during first discharge than was extracted during first charge. A large irreversible capacity is undesirable for practical applications. Good capacity retention and small irreversible capacity correlate with a well-layered crystal structure. An ideal well-layered crystal structure has a large c:a ratio and a small amount of transition metals mislocated on lithium sites. However, in practice, preparation of samples with only a small amount of Ni in the Li layer sites is difficult. The amount of Ni on lithium sites can be estimated from Rietveld refinements of X-ray diffraction data. Alternatively, Dahn et al. in Solid State Ionics 44 (1990) 87 defined an R-factor which sensitively correlates with the concentration of Ni on lithium sites. R is defined as the ratio of integrated intensities of the 101, 006 and 102 peaks of the diffraction pattern of the layered material having the R-3m structure. Many prior art disclosures suggest ways to prepare $LiNiO_2$ with a small amount of misplaced Ni on lithium sites, i.e. they try to prepare $LiNiO_2$ materials with a small value R, but these methods have not completely solved the problem, or are not economically feasible.

Another basic problem of $LiNiO_2$-based materials is that they become very reactive if overcharged, i.e. charged to voltages where significantly more than around 60% of the nickel is oxidized from the 3+ to the 4+ state. In large cells the overcharged cathode decomposes slowly, generating more heat than the cell can release to the environment. This accelerates the decomposition reaction ultimately leading to thermal runaway with explosion, ignition or venting of the battery. In practice large batteries cannot use $LiNiO_2$ as cathodes because they tend to go into thermal runaway, and are therefore unsafe.

Dahn et al. in Solid State Ionics 69 (1994) 265 showed that charged $LiNiO_2$ is hazardous since $Li_{1-x}NiO_2$ contains the very reactive tetravalent Ni ion. The cathode tends to react to form a rocksalt type $Li_xNi_{1-x}O$ as discussed in Arai et al. in Solid State Ionics 109 (1998) 295. In the rocksalt structure Ni has a more preferred lower average valence state. The reaction is accompanied by a release of oxygen which can react with the electrolyte.

Doping $LiNiO_2$ with less reactive or non-reactive materials can lead to materials where the reactive $Ni^{4+}$ is diluted. Substitution of Ni ions with other cations has also been shown to improve the electrochemical performance in some cases. For example, U.S. Pat. No. 5,750,288 (Rayovac) issued May 12, 1998, describes the modification of $LiNiO_2$ by substituting up to 30% of the Ni by a non-transition metal element from the group Al, Ga, Sn and Zn. Substitution has been shown to improve the safety of $LiNiO_2$-type materials to some degree by doping with Al by Ohzuku et al in J. Electrochem. Soc. 142 (1995) 4033, and by doping with $Mg_{1/2}Ti_{1/2}$ by Gao et al in Electrochemical and Solid State Letters 1 (1998) 117.

Substitution of nickel with a fraction of cobalt (e.g. $Li[Ni_{1-x}Co_x]O_2$ where x is about 0.2 to 0.3) can lead to a material with good electrochemical properties. Such materials are described for example by Delmas et al. in J. Power Sources 43/44 (1993) 595. However, the safety problems associated with $LiNiO_2$ are not completely solved, as shown by Paulsen and Dahn in Abstract 43, Proceedings of the 195th Meeting of the Electrochemical Society, Seattle, May 2–6, 1999. Furthermore the substitution of nickel by cobalt increases the cost of the material relative to $LiNiO_2$.

The use of manganese as a dopant in $LiNiO_2$-based compounds has been anticipated to provide certain advantages. Since manganese is cheap and non-hazardous, a large Mn content in an $LiNiO_2$ based cathode would be desired not only for safety considerations but also for price.

Substitution of Ni in $LiNiO_2$ by manganese was described by Dahn et al. in Solid State Tonics 57 (1992) 311. In that report it was shown that $LiNiO_2$ can be substituted with manganese leading to $Li[Ni_{1-x}Mn_x]O_2$ with a maximum substitution limit of x being approximately 0.5. Where x>0.5, the materials were not monophase but a phase mixture containing $Li_2MnO_3$, and $Li_yNi_{1-y}O$ with the rocksalt structure. However it was reported that $LiNiO_2$ with large amounts of manganese, especially $Li[Ni_{1/2}Mn_{1/2}]O_2$, did not cycle well.

U.S. Pat. No. 5,264,201 (Dahn et al.) issued Nov. 23, 1993, described a method for making $LiNi_{1-y}M_yO_2$ where M may be Co, Fe, Cr, Ti, Mn or V and y is less than about 0.2 (with the exception that y is less than about 0.5 when M is Co). The method was intended to provide a material which was substantially free of lithium hydroxide or lithium carbonate, and which had improved cycling capacity over unsubstituted $LiNiO_2$. However this disclosure stated that the improved cycling capacity was only maintained when up to 20% of the Ni is replaced by Co, Fe, Cr, Ti, Mn or V (or up to 50% for Co), and did not describe the preparation of compounds with higher amounts of substitution.

U.S. Pat. No. 5,370,948 (Matsushita) issued Dec. 6, 1994, described a method to produce $LiNi_{1-x}Mn_xO_2$ where x is between 0.05 and 0.45. Compositions where Mn is substituted for Ni up to 50% were described, but the crystal structures of the compounds were not well-layered. This was evidenced by the X-ray diffraction data presented in the disclosure, which show only a single diffraction peak in the region 63–66 degrees two theta, described as the 110 peak. Layered rhombohedral compounds with c/a ratios greater than 1 show two peaks in this region (hexagonal 108 and 110 peaks). It is furthermore clear from the X-ray diffraction data presented for the higher amounts of Mn substitution (eg 40% Mn) that the compounds became less layered for increasing amounts of Mn substitution. There was also evidence for the formation of a second phase (probably $Li_2MnO_3$) in the data for 40% Mn substitution.

U.S. Pat. No. 5,626,635 (Matsushita) issued May 6, 1997, described a process to produce $LiNi_{1-y}M_yO_2$ compounds where M is either Co or Mn. Where M is Mn, y was preferred to be equal to or less than 0.3. According to the disclosure, when more than 30% of Ni was substituted by Mn, crystalline growth became difficult and the materials cycled poorly when used as cathodes in secondary lithium cells. The process for making the materials recommended restricting the temperature range between 600 and 800 degrees. According to the disclosure, if materials containing Mn substituted for Ni were heated above 800 degrees, Mn mislocated in the Li sites of the crystal structure causing disorder and deterioration of the discharge capacity and cycle life.

U.S. Pat. No. 5,393,622 (Matsushita) issued Feb. 28, 1995, described a method to prepare $Li_yNi_{1-x}M_xO_2$ with $0<x\leq0.3$ and $1\leq y\leq1.3$. The method was a multi-step solid state reaction using a Li salt, Mn oxide or carbonate, and Ni carbonate or hydroxide. Materials were prepared with varying lithium content. It was shown that additional Li (y>1) could be inserted into layered Mn doped $LiNiO_2$. However it was observed that not more than 0.3 mol Mn could be introduced to the crystal structure. When x was higher than 0.3, a lower crystallinity was observed, and when x was 0.4 a Mn spinel peak appeared in the X-ray diffraction data, showing formation of a second phase. The materials described for x up to 0.3 were layered phases having c/a ($=c_{hex}/(24^{0.5}a_{hex})$) ratios of approximately 1.010, and $c_{hex}$ axes generally "being in the range 14.15<c<14.24 Å", i.e. not as well-layered as may be achieved by the present invention described in the present disclosure.

U.S. Pat. No. 6,045,771 (Fuji Chemical Industry Co.) issued Apr. 4, 2000, described a process to prepare $Li_{y-x1}Ni_{1-x2}M_xO_2$, where M represents one element selected from the group consisting of Al, Fe, Co, Mn and Mg, $x=x_1+x_2$, $0<x_1\leq0.2$, $0\leq x_2\leq0.5$, $0<x\leq0.5$, and $0.9\leq y\leq1.3$. The compounds disclosed included $LiN_{1-x}Mn_xO_2$ where x was up to 0.4, however the increasing amount of Mn resulted in an increasing capacity fade.

Japanese Patents JP3047693 and JP3042128 (Matsushita) also described batteries comprising $LiNi_{1-x}Mn_xO_2$ materials made by specialized processing routes, but once again the capacity decreased markedly when the Mn content was increased above 0.3, therefore compositions with $0<x<0.3$ were preferred.

European Patent Application EP 0 918 041 (Fuji Chemical Industry Co.) described materials $Li_yNi_{1-x}Co_{x1}M_{x2}O_2$ wherein $0.9\leq y\leq1.3$, $0<x\leq0.5$, $0<x_1<0.5$, $x_1+x_2=x$, and when M is Mn $0<x_2\leq0.3$. Only one material containing Mn was described, where $x_2=0.05$. U.S. Pat. No. 6,040,090 (Sanyo Electric Co.) issued Mar. 21, 2000, and European Patent Application EP 0 944 125, also described lithium-metal compound oxides containing combinations of Ni, Co and Mn. The compounds disclosed all had at least 49% Ni (as percentage of total Ni+Co+Mn), and a maximum of 40% Mn (as percentage of total Ni+Co+Mn).

Combinations of Ni, Co and Mn were also described in European Patent Application EP 0 782 206 (Japan Storage Battery Company), however a significant decrease in capacity of the batteries was observed when the amount of Mn was increased above 30% (as percentage of total Ni+Co+Mn), therefore the preferred compositions contained Mn at less than 30%. The addition of Al was also considered desirable to improve the thermal safety characteristics.

In summary, although the potential benefits of substituting large amounts of Mn into $LiNiO_2$ materials have been frequently discussed in the prior art, materials where large amounts of Mn have been substituted have not been demonstrated to provide acceptable electrochemical properties. This can generally be related to a poor layer character of the crystal structure or to the trend that manganese rich $LiNiO_2$ tend to phase separate to multi-phase mixtures.

It is an object of the present invention to provide lithiated oxide materials with a well layered crystal structure which reduce or overcome at least some of the abovementioned problems, or which at least provide the public with a useful alternative.

Other objects of the present invention may become apparent from the following description which is given by way of example only.

SUMMARY OF THE INVENTION

According to one aspect of the present invention there is provided a single phase cathodic material of composition $Li[Li_xCo_yA_{1-x-y}]O_2$ where $A=[Mn_zNi_{1-z}]$, $0.4\leq z\leq0.65$, $0<x\leq0.16$ and $0.1\leq y\leq0.3$, and wherein the additional x lithium is included in the transition metal layers of the structure. In a preferred form, the material is a single-phase well-layered R-3m crystal structure having a c/a ratio>1.012 (where this ratio is defined as $c_{hex}/24^{1/2}a_{hex}$).

In one preferred form $0.05\leq x\leq0.10$, y is substantially equal to 0.16, and z is substantially equal to 0.50.

According to a further aspect of the present invention there is provided a method of manufacture of a material of composition Li[Li$_x$Co$_y$A$_{1-x-y}$]O$_2$ where A=[Mn$_z$Ni$_{1-z}$], 0.4≦z≦0.65, 0≦x≦0.16 and 0.1≦y≦0.3, the material is a single-phase well-layered R-3m crystal structure having a c/a ratio >1.012 (where this ratio is defined as $c_{hex}/24^{1/2}a_{hex}$), and the additional x lithium is included in the transition metal layers of the structure, the method including the steps of: preparing a precursor with mixed metal cations including Ni, Mn and Co, mixing the said precursor with stoichiometric amounts of a Li source, and reacting the resulting mixture at an elevated temperature. In one preferred embodiment, it is contemplated that the precursor be heated at a temperature in the range substantially 500–1000° C. in an oxygen containing atmosphere. It is also contemplated that such a temperature may be in the range substantially 900–1000° C. Preferably for at least 12 hours.

Preferably, the said precursor may be a mixed metal hydroxide.

Preferably, the mixed metal hydroxide may be prepared by co-precipitation from a solution containing Ni, Mn and Co.

In an alternative form the said precursor may be a mixed metal oxide M$_3$O$_4$, where M is a combination of Ni, Mn and Co.

Preferably, the M$_3$O$_4$ may be prepared from a mixed metal hydroxide.

In an alternative form the said precursor may be a mixed metal oxide MO, where M is a combination of Ni, Mn and Co.

Preferably, the mixed metal oxide MO may be prepared from a mixed metal hydroxide.

In an alternative form the mixed metal precursor may be a mixed metal oxide Li$_x$MO$_2$ where M is a combination of Ni, Mn and Co and wherein x is substantially 1. Preferably, the lithium source may be Li$_2$CO$_3$.

According to a further aspect of the present invention there is provided a method of producing a material of composition Li[Li$_x$Co$_y$A$_{1-x-y}$]O$_2$ where A=[Mn$_z$Ni$_{1-z}$], 0.4≦z≦0.65, 0<x≦0.16 and 0.1≦y≦0.3, the material is a single-phase well-layered R-3m crystal structure having a c/a ratio>1.012 (where this ratio is defined as $c_{hex}/24^{1/2}a_{hex}$), and the additional x lithium is included in the transition metal layers of the structure, the method including the steps of: mixing powders of metal oxides, the metal oxides including Ni, Mn, Co and lithium, ball milling the mixture to produce a precursor oxide, and heating the precursor oxide.

In one preferred form the metal oxides may be selected such that the total lithium and oxygen content has substantially the stoichiometry required in the final lithiated oxide material.

In a further preferred form heating the precursor oxide or reacting the mixture may be at a temperature in the range substantially 500–1000° C. in an oxygen containing atmosphere.

Preferably, the temperature may be in the range substantially 900–1000° C. Preferably for at least 12 hours.

According to a further aspect of the present invention there is provided a method of manufacture of a lithiated oxide material having a layered crystal structure substantially as herein described and with reference to any one of the accompanying examples of the invention and/or figures.

According to a further aspect of the present invention there is provided a lithiated oxide material having a layered crystal structure substantially as herein described and with reference to any one of the accompanying examples of the invention and/or figures.

According to a further aspect of the present invention there is provided a cathode for use in a secondary lithium ion electrochemical cell, said cathode including as active material a lithiated oxide material as herein before described.

According to a further aspect of the present invention there is provided a secondary lithium ion electrochemical cell including a lithium intercalation anode, a suitable non-aqueous electrolyte including a lithium salt, a cathode including as active material a lithiated oxide material substantially as herein described, and a separator between the anode and the cathode.

According to a further aspect of the present invention there is provided use of a lithiated oxide material as herein before described in the manufacture of a cathode and/or a secondary lithium ion electrochemical cell.

Other aspects of the present invention may become apparent from the following description which is given by way of example only and with reference to the accompanying figures.

BRIEF DESCRIPTION OF THE DRAWINGS

FIG. 8 Charging regime of the LiCoO$_2$, LiNi$_{0.7}$Co$_{0.2}$Ti$_{0.05}$Mg$_{0.04}$O$_2$ and Li[Li$_{0.11}$M$_{0.89}$]O$_2$ cathodes of Example 7 prior to the DSC measurement.

FIG. 9 DSC results for commercial LiCoO$_2$ charged to 4.2 V, of commercial LiNi$_{0.7}$Co$_{0.2}$Ti$_{0.05}$Mg$_{0.04}$O$_2$ charged to 4.3 V and 4.5 V and of Li[Li$_{0.11}$M$_{0.89}$]O$_2$ (where M=(Ni$_{1/2}$Mn$_{1/2}$)$_{5/6}$Co$_{1/6}$) charged to 4.3, 4.4 and 4.5 V as described in Example 7.

DETAILED DESCRIPTION OF THE INVENTION

Figure 1:
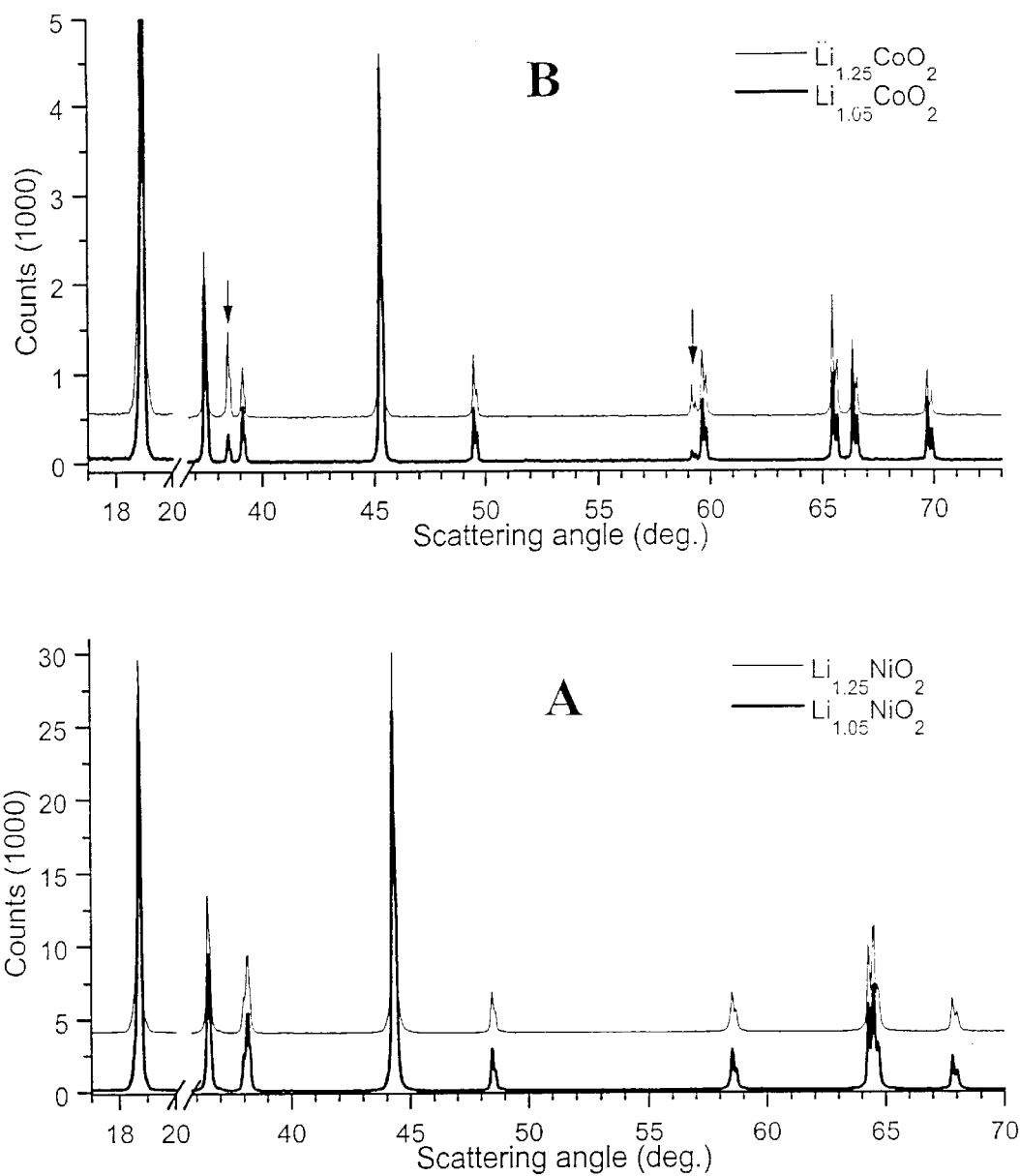
FIG. 1 X-ray diffraction patterns of the (A) "lithium rich" LiNiO$_2$ samples 1A and 1B, and (B) "lithium rich" LiCoO$_2$ samples 1C and 1D of Comparative Example 1.

While this invention is susceptible of embodiment in many different forms, there is shown in the drawings and will herein be described in detail several specific embodiments with the understanding that the present disclosure is to be considered as an exemplification of the principles of the invention and is not intended to limit the invention to the embodiments illustrated.

The present invention describes layered lithium/transition metal oxide cathode materials, which include significant manganese substitution to provide a low-cost cathode material with competitive electrochemical properties and good thermal safety characteristics.

The materials of invention are well layered. They have a small amount of t transition metal mislocated on lithium sites, and they have a large c:a ratio greater than 1.012. The c:a ratio is defined as the ratio of the hexagonal lattice constant c divided by the hexagonal lattice constant a, divided by $24^{1/2}$. A large c:a ratio corresponds to a small rhombohedral angle $\alpha$.

The materials of the invention are based on the composition $Li[Mn_zNi_{1-z}]O_2$. An important aspect of the invention is that z should be as large as possible, and preferably greater than at least 0.4, to achieve a low cost of production and good thermal safety characteristics. However, prior art has consistently taught that the electrochemical properties of the materials where $z \geq 0.4$, when employed as the cathode active material in a secondary lithium cell, are relatively poor. Most notably the capacities are lower and the cycling stability is inferior when compared with compositions where z<0.4. These problems are addressed and solved by the following aspects of the present invention.

According to one aspect of the present invention, substitution of nickel by manganese in $Li[Mn_zNi_{1-z}]O_2$, $z \geq 0.4$, makes it possible to introduce additional lithium into the crystal structure of the material. The additional lithium is doped into the transition metal layer cation sites to give a material of composition $Li[Li_xMn_zNi_{1-x-z}]O_2$. The amount of additional lithium can be varied as demonstrated in the Examples of the invention. The role of lithium in the transition metal layers in these materials is to stabilize a well layered structure with less tendency to have transition metal cations located in the lithium layers. This is because one driving force for mislocation of transition metals in the lithium layers is the contribution from the site entropy. In a stoichiometric, well ordered material $Li[M]O_2$ there is a large gain in site entropy if some Li and M exchange sites. This effect is called cation mixing. If the material has an excess of Li then the ideal configuration would be $Li[Li_xM_{1-x}]O_2$. Here the gain in site entropy if M occupies lithium sites leading to $\{Li_{1-y}M_y\}[Li_{x+y}M_{1-x-y}]O_2$ is much reduced. In the materials of the present invention, additional lithium doping into the transition metal layers leads to cathodes with a very small amount of transition metals in the lithium layers resulting in good electrochemical properties. Lithium also helps to dilute the reactive $Ni^{4+}$ thus further improving the thermal safety properties.

The benefits of incorporating additional lithium into the structure to obtain phases with a better layer structure can also be described in an alternative way. A survey of $LiMO_2$ materials ($LiCrO_2$, $LiAlO_2$, $LiMnO_2$, $LiCoO_2$, $LiNiO_2$, $LiTiO_2$) shows that the phases tend to be well layered if the transition metal cation has an ionic radius significantly smaller than lithium. The more the radii approach each other, the more difficult it is to prepare well-layered phases. Pure $LiMnO_2$ which has trivalent manganese, for example, is not thermodynamically stable in a layered structure. On the other hand, adding lithium to $LiMnO_2$ leads to $Li[Li_{1/3}Mn_{2/3}]O_2$ (otherwise known as $Li_2MnO_3$) which always crystallises in a layered structure. This can be explained by the fact that the ionic radius of tetravalent manganese is much smaller than that of lithium. Also the average ionic radius of ⅓ $Li^+$ and ⅔ $Mn^{4+}$ is still significantly smaller than the radius of lithium, thus stabilizing the layered structure.

The concept of directly doping Li into the transition metal layer does not work for $LiNiO_2$. A phase $Li[Li_{1/3}Ni_{2/3}]O_2$ (where Ni is tetravalent) can be prepared under extremely oxidizing conditions, but is not stable at high temperatures or lower oxygen partial pressure. Additional lithium can be doped into Co leading to phases with a stoichiometry $Li_{1+y}Ci_{1-y}O_2$. However, in this case the doping is not beneficial. Undoped $LiCoO_2$, has a perfect layer structure $Li[Co]O_2$, but the lithium rich phase $Li_{1+x}Co_{1-x}O_2$ leads to a material $Li_{1-y}Co_y[Li_{x+y}Co_{1-x-y}]O_2$ which has a significant amount of cation mixing.

Compared with other dopants described in the prior art to modify the transition metal layers in $LiNiO_2$-based materials, lithium doping has another advantage. Lithium is a very light element. In many battery applications the gravimetric energy density or capacity is of interest. Dopants such as Al, and $Mg_{1/2}Ti_{1/2}$ for Ni in $LiNiO_2$ are electrochemically inert: they do not change the valence state during charge and discharge of the battery cathode. Their role is to improve capacity retention during cycling, and safety. The present invention uses lithium for a similar purpose. However, after lithium doping the final material will have a lower molecular weight per Ni, compared to a $LiNiO_2$ doped with heavier elements. Therefore, for a similar discharge (with respect to the transition metal valence states) the lithium doped material will have a larger gravimetric discharge capacity.

The amount x of additional Li in the materials of the invention should be at least 0.03 to obtain the described benefits of lithium in the transition metal layers. However the theoretical capacity of the material may decrease with increased lithium doping in the transition metal layer. A preferred excess of lithium may be in the range 0.05 to 0.10.

According to another aspect of the present invention, the addition of Co enhances the benefits of having additional lithium in the transition metal layers by contributing to the improvement of the layered structure with respect to prior art materials. Co is also known to improve the electronic conductivity and ionic diffusion in layered phases, which are additional advantages. The amount y of Co in the composition $Li[Li_xCo_y(Mn_zNi_{1-z})_{1-x-y}]O_2$ may be as little as 0.05, but preferably $y \geq 0.1$ to obtain the benefit of this aspect of the invention. On the other hand Co is expensive and hazardous, so that y>0.3 may significantly diminish the cost and safety benefits of the material of the invention.

In practice it is very difficult to prepare a solid solution $Li[Li_xCo_y(Mn_zNi_{1-z})_{1-x-y}]O_2$ by solid state reaction directly from precursors such as pure oxides, hydroxides or carbonates (for example $Mn_2O_3$, $Ni(OH)_2$, $Li_2CO_3$, $Co_3O_4$). Such a preparation would need very long reaction times at very high temperatures to go to completion, and the obtained cathodes show very poor cycling characteristics. The preparation is better made using methods which allow a good mixing of the different cations on an atomic scale. Such methods include precipitating, drying or gelling mixtures of dissolved transition metal salts such as hydroxides, carbonates, or oxalates, and other methods known from the literature. Such methods are called "soft chemical" routes. A preferred method for the preparation of the materials of the present invention is the coprecipitation of mixed hydroxides since it allows microstructure to be controlled. The mixed hydroxides are subsequently sintered with a source of lithium (for example $Li_2CO_3$) in a heating step.

Alternatively, well crystallized $Li[Li_xCo_y(Mn_zNi_{1-z})_{1-x-y}]O_2$ can be prepared by solid state reaction using a source of lithium and a mixed oxide. The mixed oxide has the rocksalt structure MO or spinel structure $M_3O_4$ and can be prepared by solid state reaction or from mixed hydroxides or from other precursors prepared by a soft chemical route.

In an alternative embodiment of the invention, materials with a well-layered structure are obtained by sintering precursors prepared in a high energy ball milling step. A conventional route is to prepare the transition metal precursors in a mixed oxide MO or $M_3O_4$ by ball milling. Then the transition metal precursor is mixed with a source of lithium, typically a lithium salt, and a final sintering step is made. Another conventional possibility is to ball-mill a transition metal precursor with lithium salts, following by a sintering step. These conventional methods generally do not deliver precursors for the sintering having the cations in the right valence state. An alternative approach is to ball mill materials which gives a precursor having the correct transition metal oxidation state and the lithium well mixed, before the sintering step. By this means the final equilibration to a well layered phase with a small degree of transition metal ions mislocated on lithium sites is faster and more effective during sintering. This can be achieved by ball milling mixtures of lithium transition metal oxides having the general "rocksalt" stoichiometry MO where M here contains transition metal and lithium. The layered phases $LiCoO_2$, $LiNiO_2$ and $Li[Li_{1/3}Mn_{2/3}]O_2$, as well as Al doped $LiMnO_2$ and $LiMnO_2$, can be described as cation ordered rocksalt type oxides having the general formula MO. M may additionally consist of Li, Ti, Mn, Ni, Fe, Co, Al, and/or Mg. Using a mixture of different rocksalt type precursors $LiMO_2$ allows disordered rocksalt phases of the desired stoichiometry $Li_xM_{1-x}O$ (x substantially equal to or slightly larger than 0.5) to be obtained. Precursors with a controlled excess of Li can be achieved by using a balanced mixture of $Li[Li_{1/3}Mn_{2/3}]O_2$ and $LiMnO_2$ within the precursors. In the disordered rocksalt phases obtained after ball milling the transition metal valence state is the same as in a final layered phase of same stoichiometry. Additionally the lithium is well mixed with the transition metal cations. Therefore, equilibration towards the final layered phase can occur without addition of oxygen from the gas phase and does not require long range cationic diffusion. Further, equilibration during the final sintering step is very fast.

$LiMO_2$ materials tend to have some transition metal ions mislocated in the lithium layers due to the site entropy contribution to the free formation enthalpy. The entropy contribution depends on temperature. The higher the temperature, the larger the contribution. Therefore high temperatures tend to give phases with an increased concentration of transition metal mislocated in the lithium layers, interfering with the benefits of incorporating lithium into the transition metal layers. This is well known for prior art $LiNiO_2$ and substituted $LiNiO_2$ materials, and prior art has therefore consistently taught that such materials should be prepared at relatively low temperatures and/or for relatively short heating times. For example, U.S. Pat. No. 5,626,635 (Matsushita 1997) states that $LiNi_{1-y}M_yO_2$ compounds should be reacted at less than 800° C. According to U.S. Pat. No. 5,626,635, if materials containing Mn substituted for Ni are heated above 800° C., Mn mislocates in the Li sites of the crystal structure causing disorder and deterioration of the discharge capacity and cycle life. An important characteristic of the materials of the present invention is that they may be subjected to sintering for long periods and/or at relatively high temperatures (above 900° C.). Such a sintering step actually does not degrade the layered structure and improves electrochemical performance of the materials of the invention. This characteristic distinguishes the materials of the invention from many prior art materials and prior art processes for manufacture.

A further advantage of the material of the invention is enhanced thermal safety characteristics. Manganese is relatively stable, i.e. non-reactive, in the tetravalent state when compared with cobalt or nickel. Therefore manganese is an effective dopant to improve the safety of $LiNiO_2$ based materials by diluting the reactive $Ni^{4+}$. While prior art has taught that Al or a combination of Mg+Ti might be substituted to achieve the same purpose, in practice such dopants can result in a loss of capacity and/or rate capability in the cathode. Fast lithium diffusion can only be obtained if the cathode has a high electronic conductivity. Contrary to dopants such as Al or Mg, which only are stable in one valence state, manganese is stable in the 3+ and 4+ valence states. Therefore, manganese contributes to the electronic conductivity by allowing a hopping of electrons or holes. Al or Mg do not contribute in the same way. Thus, larger doping levels of Mn than in the case of doping by Al or Mg could be applied to yield an effective dilution of the reactive $Ni^{4+}$, without loss of electronic conductivity. Manganese substitution of $LiNiO_2$ should also not decrease the theoretical maximum discharge capacity. In $LiNiO_2$ nickel is trivalent. If all the lithium is extracted, then one equivalent of nickel will have changed from the 3+ to the 4+ valent state and the capacity will be 285 mAh/g. The same maximum capacity could theoretically be obtained in $Li[Ni_{1/2}Mn_{1/2}]O_2$. In $Li[Ni_{1/2}Mn_{1/2}]O_2$ nickel could be assumed to be divalent and manganese tetravalent. If all lithium is extracted, half an equivalent of Ni has be charged from the 2+ to the 4+ valent state, yielding the same capacity.

COMPARATIVE EXAMPLE 1

This Example is illustrative and shows that the addition of extra lithium alone to $LiNiO_2$ or $LiCoO_2$ does not lead to improved layered structures in these materials. $Li_2CO_3$ and $Ni(OH)_2$ were mixed and ground in stoichiometric ratios Li:Ni=1.05:1 (sample 1A) and Li:Ni=1.25:1 (sample 1B). The resulting powders were reacted in air for 2 days at 750° C.

$Li_2CO_3$ and CoO were mixed and ground in stoichiometric ratios Li:Co=1.05:1 (sample 1C) and Li: Co=1.25:1 (sample 1D). The resulting powders were reacted in air for 2 days at 750° C.

X-ray diffraction patterns (recorded on a Philips X'Pert instrument using Cu K radiation) are shown in FIG. 1 for the four samples. All materials were predominantly layered phases having the R-3m structure. The X-ray pattern of sample 1A ($LiNiO_2$) showed traces of $Li_2CO_3$. The pattern of sample 1B showed an increase of intensity of peaks related to $Li_2CO_3$. This indicates that the excess of lithium is not incorporated into the $LiNiO_2$ materials. This is confirmed by a careful analysis of the X-ray diffraction pattern. Results are given in Table 1. The unit cell volume is given for a formula unit $LiMO_2$. Samples 1A and 1B have similar lattice constants and R-values, where the experimental R-value is obtained by calculating the ratio of the integrated intensities of the 006 plus 102 peaks to the integrated intensity of the 101 peak. The R-value is related to the amount x of lithium in the lithium layer by the formula:

$$R = \frac{4}{3} \frac{(1.6-x)^2}{x^2}$$

Therefore, 1−x is the number of misplaced transition metal.

The R-value therefore allows estimation of the compositions of the $\{Li_{1-x}Ni_x\}[Ni]O_2$ phases (also given in Table 1). The R-values for samples 1A and 1B are both above 0.7, indicating that a large amount of nickel is mislocated on lithium layers. It can be concluded that Li addition on its own is not effective for LiNiO$_2$ to obtain well-layered materials with additional lithium in the transition metal layers.

Samples 1C and 1D were both monophase materials. The lattice constants are the same. A careful analysis of the X-ray diffraction patterns yields the results that additional lithium can be incorporated into the transition metal layers of LiCoO$_2$. The low-doped sample 1C (stoichiometry near to LiCoO$_2$) has a well-layered structure. The R-value is near to the ideal value for a layered structure with no transition metal in the lithium layer. However, sample 1D which is lithium-rich (stoichiometry approx. Li$_{1.11}$Co$_{0.89}$O$_2$) is less layered. The R-value is large, R=0.7. For cathodes with composition Li$_{1+y}$Co$_{1-y}$O$_2$ and structure {Li$_{1-x}$Co$_x$}[Li$_{y+x}$Co$_{1-x-y}$]O$_2$ the following relation can be obtained $$R = \frac{4}{3} \frac{\{27(1-y)+3(1+y)-16\}^2}{\{27(1-y-2x)-3(1-y-2x)\}^2}$$

In the case of sample 1D this shows that the lithium-rich LiCoO$_2$ has a large amount of misplaced cobalt cations on lithium layers. The structure can be estimated as {Li$_{0.87}$Co$_{0.13}$}[Li$_{0.24}$Co$_{0.76}$]O$_2$.

Clearly, doping of LiNiO$_2$ or LiCoO$_2$ by lithium alone does not give well layered structures. However subsequent examples will show that substitution by manganese does allow well layered materials with Li in the transition metal layer to be obtained in the materials of the invention.

Samples 2E and 2F had a composition Li[Li$_y$M$_{1-y}$]O$_2$ with y=0.064 and y=0.106, M=Mn$_{0.416}$Ni$_{0.415}$Co$_{0.169}$.

Figure 2:
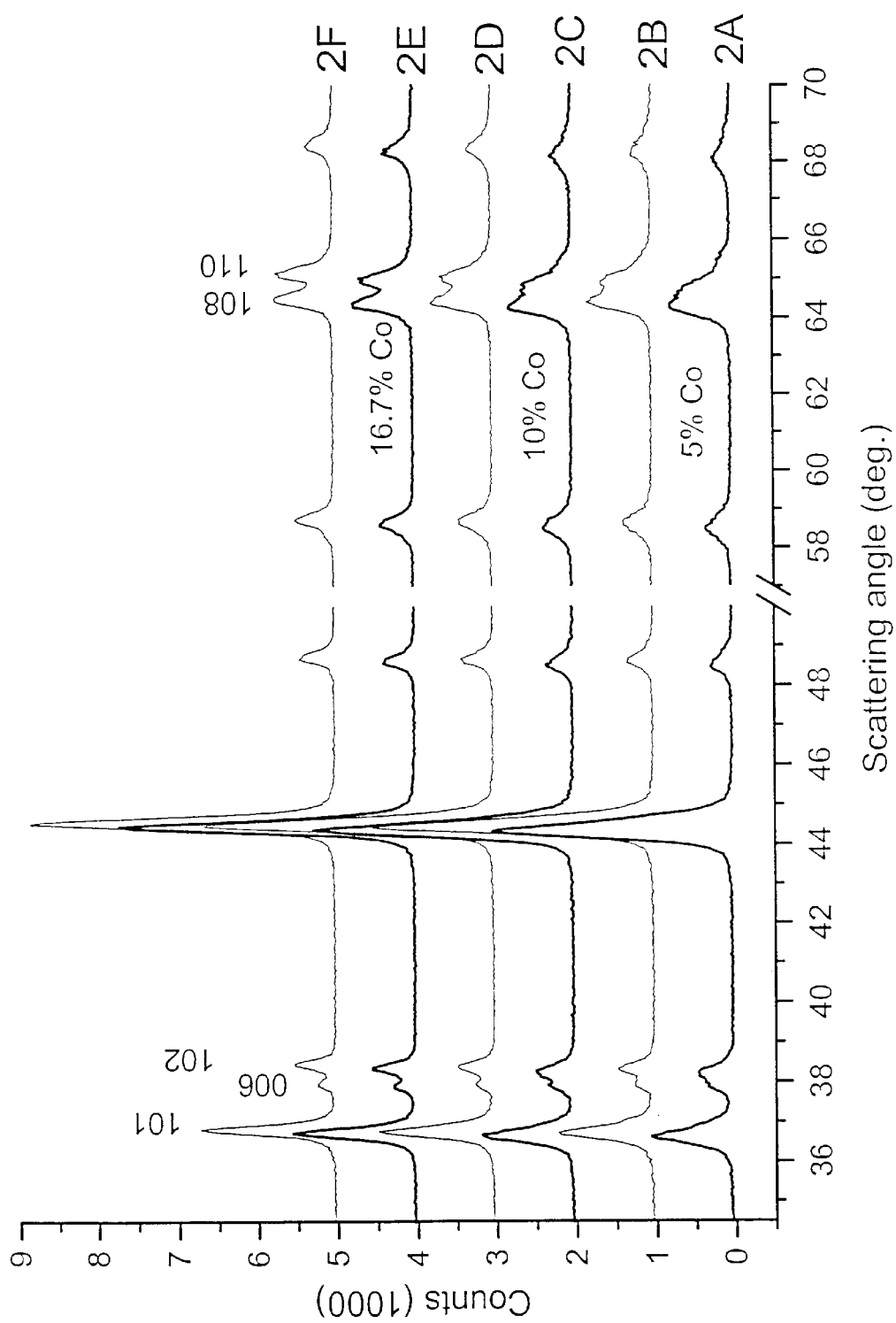
FIG. 2 X-ray diffraction patterns of samples 2A–F prepared as described in Example 2.

All samples were monophase and had the layered alpha-NaFeO$_2$ structure. FIG. 2 shows two significant regions of the X-ray patterns. The diffraction patterns become more regular and characteristic of a well layered structure with increasing content of Co. More specifically, the separation between the 108 and 110 peaks, as well as the separation between 006 and 102 peaks, becomes larger. Structural data obtained by a careful analysis of the X-ray diffraction data are given in Table 2A. Comparing the results for samples 2A and 2B, 2C and 2D, and 2E and 2F, where the second sample of each pair is more Li rich, shows that for all doping levels of Co the more Li-rich sample has a larger c/a ratio. It can be concluded that the additional introduced lithium provides a more perfect layered structure.

Figure 3:
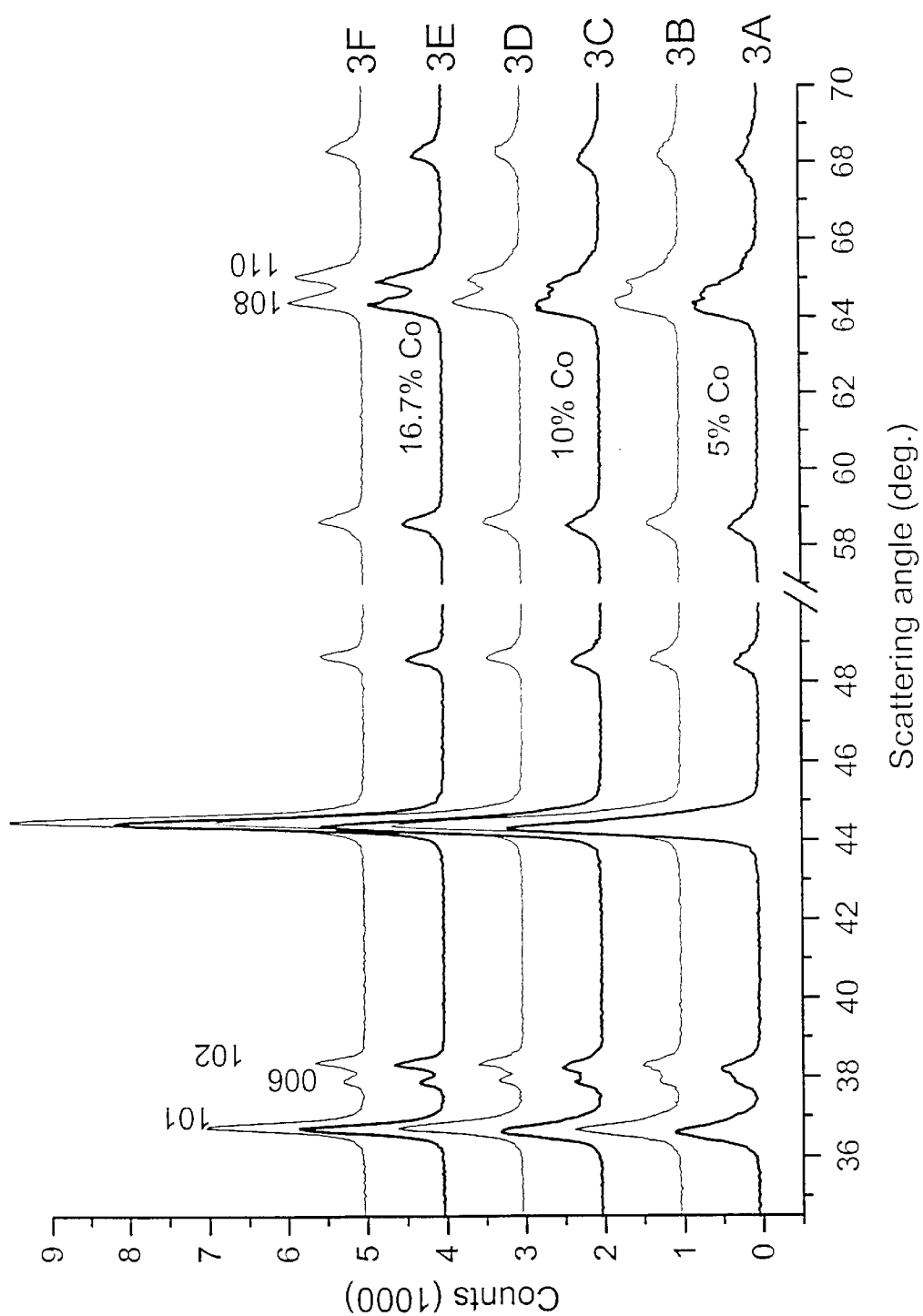
FIG. 3 X-ray diffraction patterns of samples 3A–F prepared as described in Example 3.

Samples 2A–F were sintered for a further four days at 750° C. in air to give samples 3A–F. All the samples after sintering were monophase and had the layered alpha-NaFeO$_2$ structure. FIG. 3 shows two significant regions of the X-ray pattern. The diffraction patterns become more regular and characteristic of a well layered structure with increasing content of Co. More specifically, the separation between the 108 and 110 peaks, as well as the separation between 006 and 102 peaks, becomes larger. Structural data obtained by a careful analysis of the X-ray diffraction data are given in Table 2B. Comparing the results for samples 3A and 3B, 3C and 3D, and 3E and 3F, where the second sample of each pair is more Li rich, shows that for all doping levels

TABLE 1

Structural data for the materials of Example 1

| Sample | a/Å | c/Å | Vol/Å$^3$ | R-value | Estimated Composition of R-3m phase |
|---|---|---|---|---|---|
| 1A | 2.8883 ± 0.0004 | 14.222 ± 0.03 | 34.25 ± 0.01 | 0.78 | {Li$_{0.89}$Ni$_{0.11}$}[Ni]O$_2$ |
| 1B | 2.8872 ± 0.0005 | 14.221 ± 0.04 | 34.22 ± 0.02 | 0.74 | {Li$_{0.9}$Ni$_{0.1}$}[Ni]O$_2$ |
| 1C | 2.8173 ± 0.0002 | 14.058 ± 0.001 | 32.21 ± 0.005 | 0.425 | Li[Co$_{0.98}$Li$_{0.02}$]O$_2$ |
| 1D | 2.8178 ± 0.0002 | 14.059 ± 0.001 | 32.225 ± 0.005 | 0.71 | {Li$_{0.87}$Co$_{0.13}$}[Li$_{0.24}$Co$_{0.76}$]O$_2$ |

EXAMPLES 2 and 3

These examples show that doping additional lithium into the transition metal layers of the materials of the invention results in layered materials with a lower concentration of transition metal ions misplaced on lithium layers. This beneficial effect is increased if the materials also contain cobalt. When the amount of cobalt is greater than approximately 10% of the total transition metal, well layered structures are thermodynamically preferred. In this case longer reaction times allow an equilibration of the material toward well-layered structures with a very small concentration of misplaced transition metals.

Mixed hydroxides [Co$_x$(Mn$_z$Ni$_{1-z}$)$_{1-x}$]O$_w$(OH)$_q$ were prepared by coprecipitation from Mn—Ni—Co nitrate solutions with NaOH solution. Three different mixed hydroxides with z=approx. 0.5 but with different contents of cobalt (approx. 5%, 10% and 16.7% of the transition metals) were prepared. The precipitates were collected and dried at 120° C. in air. The precipitates were then mixed with different stoichiometric amounts of Li$_2$CO$_3$ and ground. The resulting powders were reacted in air for 36 hours at 750° C. Chemical analysis of the final samples gave the following results:

Samples 2A and 2B had a composition Li[Li$_y$M$_{1-y}$]O$_2$ with y=0.095 and y=0.134, M=Mn$_{0.469}$Ni$_{0.48}$Co$_{0.051}$.

Samples 2C and 2D had a composition Li[Li$_y$M$_{1-y}$]O$_2$ with y=0.083 and y=0.123, M=Mn$_{0.449}$Ni$_{0.45}$Co$_{0.101}$.

of Co the more Li-rich sample has a larger c/a ratio. It can be concluded that the additional introduced lithium provides a more perfect layered structure.

From the experimentally obtained R-values (ratios of integrated peak intensities) the concentration of misplaced transition metal cations was estimated. For a material with stoichiometry Li[Li$_y$M$_{1-y}$]O$_2$, M=(Ni$_{1/2}$Mn$_{1/2}$)$_{5/6}$Co$_{1/6}$ and some cation mixing (x M interchange places with x lithium) leading to a formula {Li$_{1-x}$M$_x$}[Li$_{y+x}$M$_{1-y-x}$]O$_2$, R depends on x and y according to the formula:

$$R = \frac{4}{3} \frac{\{(1-y)*26.6+(1+y)*3-16\}^2}{(\{(1-y-2x)*26.6-(1-y-2x)*3\})^2}$$

Figure 4:
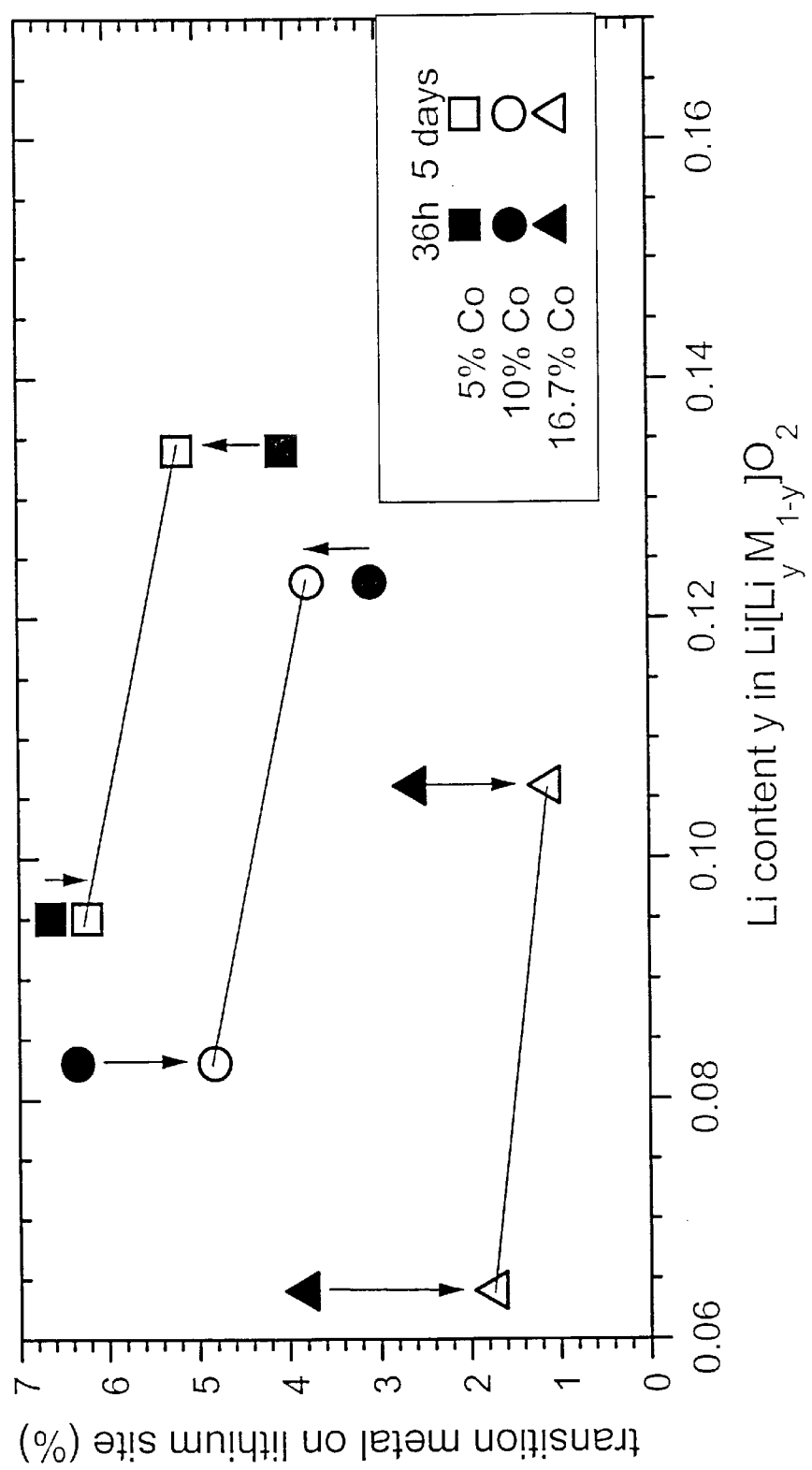
FIG. 4 Concentration of misplaced cations in Li[Li$_y$M$_{1-y}$]O$_2$ (where M=(Mn$_{1/2}$Ni$_{1/2}$)$_{1-x}$Co$_x$) as a function of y and cobalt content, as described in Examples 2 and 3.

The results are given Table 3 and in FIG. 4. FIG. 4 shows that samples which contain more lithium and more cobalt have a smaller concentration of misplaced transition metal cations. Comparing the results after 36 h and after 5 days equilibration shows that with increasing levels of cobalt the samples equilibrate towards layered structures with a smaller concentration of misplaced transition metal cations. However if the cobalt doping is too low (substantially below 10% of the total transition metal), then the equilibration tends toward less layered structures. Rietveld refinements of the X-ray diffraction data showed the same trend and similar concentrations of misplaced cations.

For all samples an increased lithium stoichiometry as well as an increased Co content leads to less degree of misplaced cations. Doping with a sufficient amount of Co ($\geq 10\%$) leads to a thermodynamic stabilization of phases with a very small degree of misplaced cations. Long reaction times are required to approach this preferable equilibration configuration. Thus this example shows that long reaction times together with a significant excess of lithium (x in Li[Li$_x$M$_{1-x}$]O$_2$ is 0.11) and a significant Co doping allows to prepare samples with an exceptionally small number (approx. 1%) of misplaced cations.

Electrodes containing samples 3D, 2E, 2F, 3E and 3F were prepared by mixing 80 wt. % of the oxide material, 12 wt. % acetylene black and 8 wt. % poly(vinylidene fluoride) as a slurry in 1-methyl-2-pyrrolidinone (NMP). The slurry was coated onto aluminum foil. After evaporation of the solvent, the coating was pressed on the aluminum foil and annealed at 150° C. under vacuum. Circular electrodes measuring 14 mm in diameter were then punched from the coated foil. The circular electrodes were weighed individually and the active mass (the total weight of the circular electrode corrected for the mass of the aluminum substrate multiplied by the fraction of the electrode weight made up by the lithiated metal oxide material) was calculated. The electrodes were then dried at 150° C. under vacuum to remove traces of water and transferred to an argon-filled dry glove box (<1 ppm water).

The electrodes were assembled into electrochemical cells within the argon-filled glove box using 2032 button cell hardware, using a circular disk of lithium foil having a thickness of 0.38 mm as the anode, and a porous glass fibre disk separator wetted with 1M LiPF$_6$ in (50 wt. % ethylene carbonate+50 wt. % dimethylene carbonate) electrolyte solution.

Cells prepared by this procedure were cycled more than 200 times between 2.0 and 4.4 V at ambient temperature (21° C.) and elevated temperature (55° C.). A constant charging current was applied until 4.4 V was reached, then the cell was held at 4.4 V until the current dropped below 15 mA/g. Cells were discharged at constant current to 2.5 V. Cells were charged and discharged at a current rate of 30 mA/g (C/5 rate) up to cycle 5 and then at 75 mA/g (C/2 rate) thereafter.

The best electrochemical performance was obtained with material 3F. It had a reversible capacity of 155 mAh/g at a C/5 rate. The capacity at C/2 rate was 139 mAh/g. After 100 cycles at C/2 rate 89% of the capacity was retained, and after 200 cycles 81% of the capacity remained. Sample 2F had similar initial capacities but the capacity faded rapidly with cycling (50% retention after 50 cycles). This example shows that materials which are prepared with a very small degree of misplaced cations by doping sufficient lithium into the transition metal layers, additionally doping with Co, and allowing long sintering time, yield cathodes with excellent electrochemical properties.

TABLE 2

Structural data for the samples of Examples 2 and 3

A) reaction: 36 h in air

|  | 2A | 2B | 2C | 2D | 2E | 2F |
|---|---|---|---|---|---|---|
| $a_{hex}$ | 2.878 ± 0.001 | 2.871 ± 0.001 | 2.876 ± 0.001 | 2.867 ± 0.001 | 2.873 ± 0.0005 | 2.867 ± 0.0005 |
| $c_{hex}$ | 14.279 ± 0.007 | 14.259 ± 0.01 | 14.281 ± 0.007 | 14.247 ± 0.01 | 14.259 ± 0.003 | 14.257 ± 0.004 |
| Volume | 34.151 ± 0.03 | 33.935 ± 0.04 | 34.096 ± 0.03 | 33.802 ± 0.04 | 33.966 ± 0.01 | 33.809 ± 0.015 |
| c: a ratio | 1.0126 | 1.0137 | 1.0136 | 1.0143 | 1.0133 | 1.0140 |
| R-factor | 0.518 | 0.413 | 0.520 | 0.412 | 0.473 | 0.400 |

B) reaction: 5 d in air at 750°

|  | 3A | 3B | 3C | 3D | 3E | 3F |
|---|---|---|---|---|---|---|
| $a_{hex}$ | 2.882 ± 0.001 | 2.875 ± 0.001 | 2.881 ± 0.001 | 2.872 ± 0.001 | 2.874 ± 0.0005 | 2.869 ± 0.0005 |
| $c_{hex}$ | 14.292 ± 0.005 | 14.271 ± 0.007 | 14.298 ± 0.006 | 14.259 ± 0.006 | 14.268 ± 0.003 | 14.257 ± 0.003 |
| Volume | 34.277 ± 0.02 | 34.059 ± 0.03 | 34.261 ± 0.025 | 33.952 ± 0.025 | 34.015 ± 0.01 | 33.866 ± 0.01 |
| c: a ratio | 1.0121 | 1.0131 | 1.0130 | 1.0135 | 1.0134 | 1.0145 |
| R-factor | 0.507 | 0.450 | 0.482 | 0.426 | 0.448 | 0.387 |

TABLE 3

Concentration of misplaced cations x in the {Li$_{1-x}$M$_x$}[Li$_{y+x}$M$_{1-x-y}$]O$_2$ samples of Examples 2 and 3, obtained from the experimental R-factors.

|  | 2A | 2B | 2C | 2D | 2E | 2F |
|---|---|---|---|---|---|---|
| x | 6.64% | 4.04% | 6.34% | 3.08% | 3.81% | 1.72% |
|  | 3A | 3B | 3C | 3D | 3E | 3F |
| x | 6.23% | 5.2% | 4.82% | 3.77% | 2.6% | 1.1% |

EXAMPLE 4

A mixed hydroxide with a composition Co$_{0.16}$Mn$_{0.43}$Ni$_{0.41}$O$_w$(OH)$_q$ was prepared as described in Examples 2 and 3, and reacted with Li$_2$CO$_3$ in a stoichiometric ratio of 1.1 Li to 1 transition metal for two days at 970° C. in air. Crystal structure data are given in Table 4. Cathodes comprising the material were prepared and tested as described in Examples 2 and 3. At 22° C. the material gave 167 mAh/g capacity at cycle 16 where the current rate was 30 mA/g, and 150 mAh/g capacity at cycle 18 where the current rate was 150 mAh/g. Less than 4% loss of capacity was observed over 100 cycles. The discharge capacity at cycle 196 (30 mAh/g) was 161 mAh/g. The material therefore demonstrated high capacity, rate capability and capacity retention, which may be correlated with the well layered crystal structure and also the beneficial effect on microstructure of using a relatively long sintering time at high temperature.

TABLE 4

Crystal structure parameters for the sample of Example 4.

| | |
|---|---|
| $a_{hex}$ (Å) | 2.879 ± 0.0001 |
| $c_{hex}$ (Å) | 14.286 ± 0.001 |
| Vol (Å$^3$) | 34.180 ± 0.003 |
| c/a | 1.0129 |
| R-factor | 0.494 |
| M mislocated on Li sites | 4.2% |

EXAMPLE 5

In this Example we show that the materials of the invention can be prepared by reacting a source of lithium with a precursor having the $M_3O_4$ type spinel structure, and also by reacting additional lithium with a precursor of composition $Li_{1+x}MO_2$ having the layered $NaFeO_2$ structure.

Figure 5:
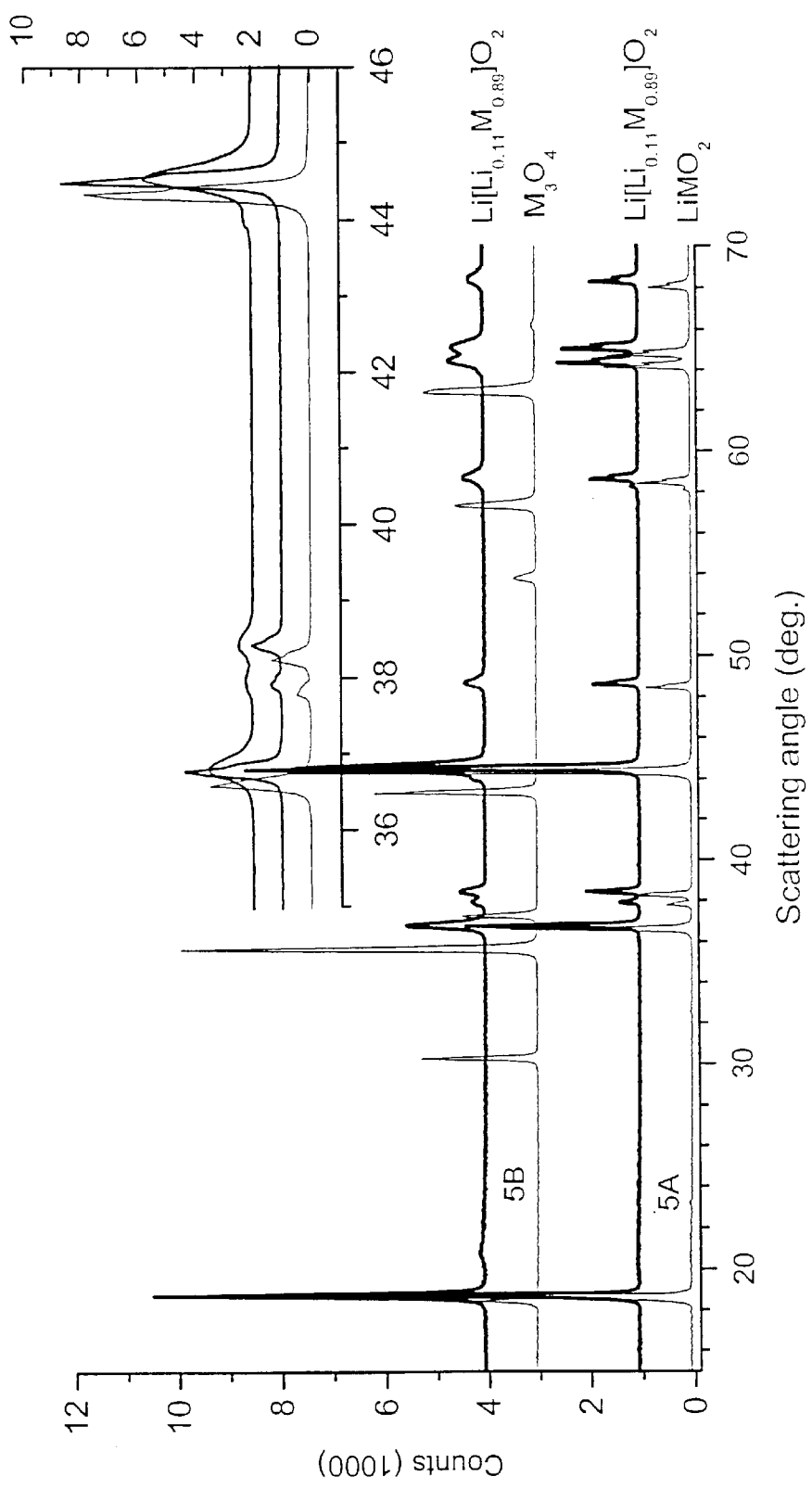
FIG. 5 X-ray diffraction patterns of the precursors and final Li[Li$_y$M$_{1-y}$]O$_2$ (where M=(Ni$_{1/2}$Mn$_{1/2}$)$_{5/6}$Co$_{1/6}$, y=0.11) materials 5A and 5B prepared as described in Example 5. (The inset shows an enlargement of the region 35–46 deg. for the phases having the layered NaFeO$_2$ structure.)

$M_3O_4$, where $M=(Ni_{1/2}Mn_{1/2})_{5/6}Co_{1/6}$, was prepared from a mixed $(Ni_{1/2}Mn_{1/2})_{5/6}Co_{1/6}$ hydroxide prepared as described in Examples 2 and 3, by heating the hydroxide for 2 days at 1000° C. in air. The $M_3O_4$ compound was mixed with $Li_2CO_3$ to give a nominal composition $Li[Li_xM_{1-x}]O_2$ with x=0.11. The mixed powder was reacted for 5 days at 750° C. in air to give Sample 5A. The material of Example 4 was mixed with additional $Li_2CO_3$ to give a nominal composition $Li[Li_xM_{1-x}]O_2$ with y=0.11, and reacted for 5 days at 750° C. in air to give Sample 5B. The material of Example 4 was mixed with additional $Li_2CO_3$ to give a nominal composition $Li[Li_xM_{1-x}]O_2$ with y=0.09, and reacted for 5 days at 750° C. in air to give Sample 5C. FIG. 5 shows the diffraction patterns of the precursors and final phases 5A and 5B. Sample 5C had a pattern very similar to that of sample 5B. Monophase well-layered $Li[Li_xM_{1-x}]O_2$ having the alpha-$NaFeO_2$ structure was obtained in all cases. Sample 5B and 5C is more crystalline than sample 5A, which shows peak broadening due to stress. The diffraction pattern of sample 5B and 5C also has less intensity than that of sample 5A at 20–22 deg. 2θ, indicating that the additional Li in the transition metal layers of $Li[Li_xM_{1-x}]O_2$ is better mixed.

Structural data for the samples are given in Table 5. All samples are well layered and have a large c/a ratio. However a larger c/a ratio and smaller R-factor for sample 5A indicates that it has a slightly better layer structure than sample 5B or 5C. The relation between R, x and y for $M=(Ni_{1/2}Mn_{1/2})_{5/6}Co_{1/6}$ is given by:

$$R = \frac{4}{3} \frac{\{26.6(1-y) - 3(1+y)\}^2}{\{26.6(1-y-2x) + 3(1-y-2x)\}^2}$$

Figure 6:
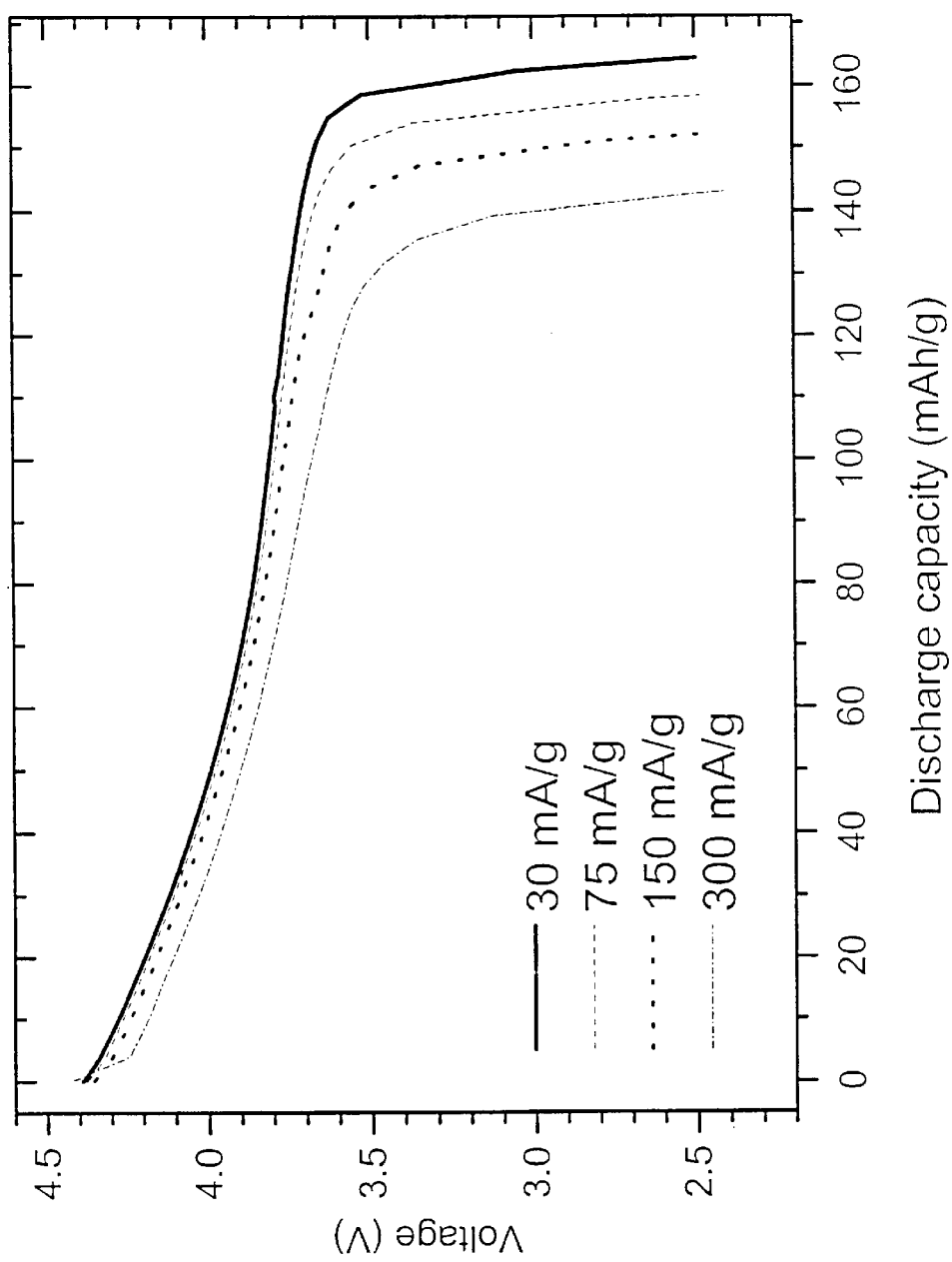
FIG. 6 Discharge voltage profiles of sample 5C for different rates

Using the experimental R obtained from the integrated intensities of the 101, 102 and 006 peaks, the structure of sample 5A is calculated as $\{Li_{0.971}M_{0.029}\}[Li_{0.14}M_{0.86}]O_2$. The structure of 5B is calculated as $\{Li_{0.971}M_{0.029}\}[Li_{0.14}M_{0.86}]O_2$ and the structure of 5C as $\{Li_{0.97}M_{0.03}\}[Li_{0.121}M_{0.879}]O_2$. The low concentration of misplaced transition metal cations on lithium layers provides good electrochemical properties. Cathodes with sample 5B and 5C were prepared and tested using the procedures described in Examples 2 and 3, and showed excellent electrochemical properties, summarized in table 6: The discharge voltage profiles of b a cell with sample 5C as cathode at C/5, C/2, C and 2C rate are given in FIG. 6.

TABLE 5

Structural data for the samples of Example 5.

| | 5A (Li[Li$_{0.11}$M$_{0.89}$]O$_2$) | 5B (Li[Li$_{0.11}$M$_{0.89}$]O$_2$) | 5C (Li[Li$_{0.09}$M$_{0.91}$]O$_2$) |
|---|---|---|---|
| $a_{hex}$ (Å) | 2.8682 ± 0.0003 | 2.8689 ± 0.0001 | 2.8717 ± 0.0001 |
| $c_{hex}$ (Å) | 14.259 ± 0.002 | 14.256 ± 0.001 | 14.264 ± 0.001 |
| vol (Å$^3$) | 33.861 ± 0.008 | 33.869 ± 0.004 | 33.955 ± 0.005 |
| c/a | 1.0148 | 1.0143 | 1.0139 |
| R-factor | 0.417 | 0.418 | 0.436 |
| M on Li | 2.9% | 2.9% | 3.0% |

TABLE 6

Results of Electrochemical testing of samples 5B and 5C

| | Sample 5B | Sample 5C |
|---|---|---|
| Discharge Capacity at cycle 3 (30 mA/g) | 163 mAh/g | 170 mAh/g |
| Discharge capacity at cycle 16 (30 mA/g) | 159 mAh/g | 164 mAh/g |
| Discharge capacity at cycle 18 (150 mA/g) | 149 mAh/g | 153 mAh/g |
| Discharge capacity at cycle 96 (30 mA/g) | 150 mAh/g | 161 mAh/g |
| Discharge capacity at cycle 96 (150 mA/g) | 138 mAh/g | 148 mAh/g |

EXAMPLE 6

This Example shows that the materials of the invention can also be synthesized from precursors prepared by high-energy ball milling. This Example will especially focus on the preparation of a rocksalt type precursor by ball milling, which contains oxygen and all cations including the lithium in the desired stoichiometric ratios and well mixed on an atomic scale. The final reaction to give the layered phase does not require long range cationic or oxygen diffusion, and is therefore a fast process allowing short reaction times.

The preparation was made in two steps: Preparing a rock salt type oxide with a well mixed oxygen and cations (including the lithium) on an atomic scale using high energy ball milling; Sintering the precursors to yield the final layered phase.

Powders of $Li_2MnO_3$ (i.e. $Li[Li_{1/3}Mn_{2/3}]O_2$), $Li[Ni_{0.8}Co_{0.2}]O_2$, and $LiCoO_2$ were prepared in air by conventional solid state reactions. $LiMnO_2$ was prepared in flowing $N_2$ by a conventional solid state reaction. $Al_2O_3$ was used as received.

Figure 7:
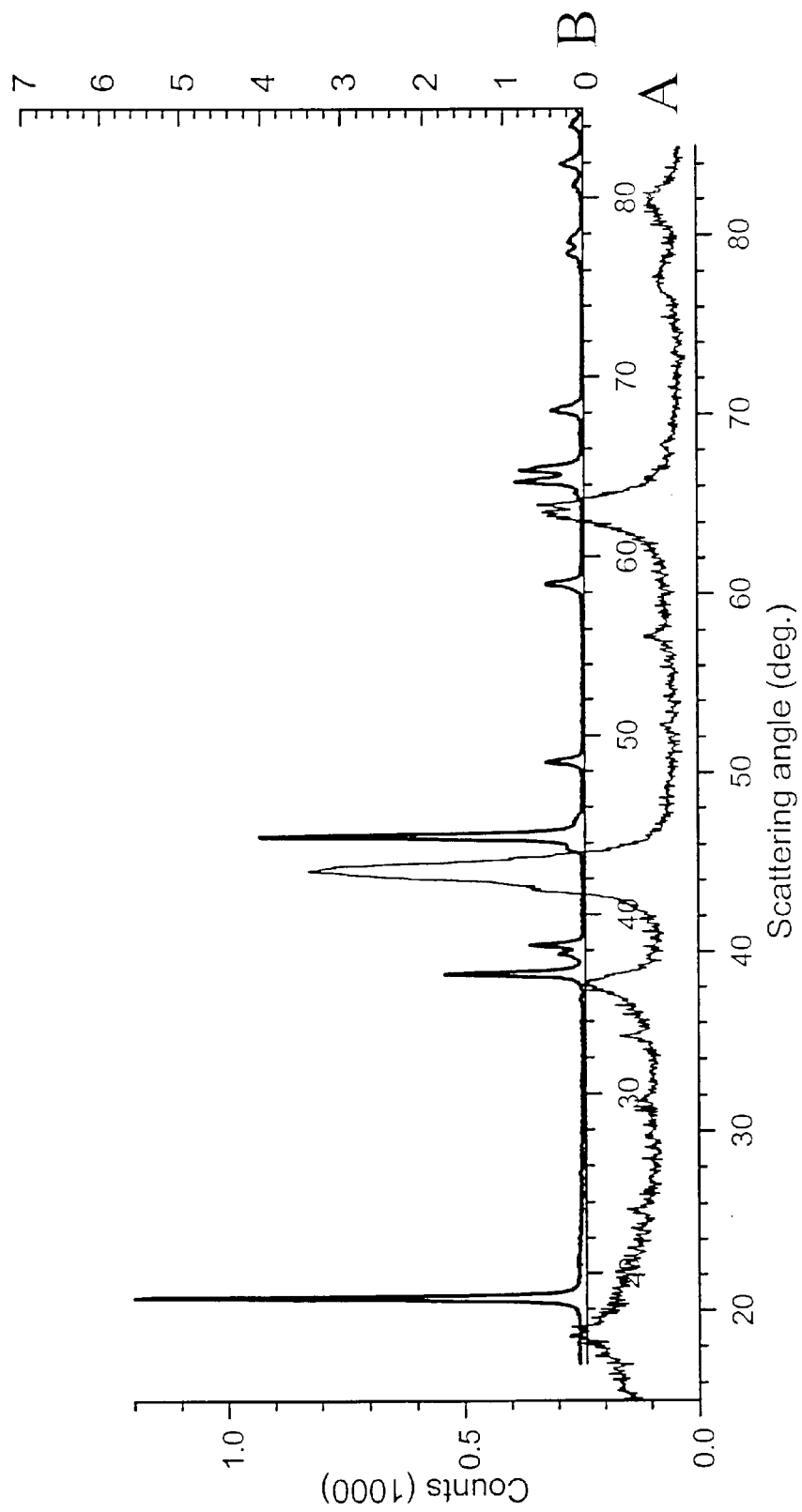
FIG. 7 X-ray diffraction pattern of (A) the ball milled rocksalt type precursor Li$_{0.525}$Mn$_{0.185}$Ni$_{0.185}$Co$_{0.07}$Al$_{0.035}$O and (B) the final material Li[Li$_{0.05}$Mn$_{0.37}$Ni$_{0.37}$Co$_{0.14}$Al$_{0.07}$]O$_2$ prepared as described in Example 6.

The powders of $Li[Li_{1/3}Mn_{2/3}]O_2$, $Li[Ni_{0.8}Co_{0.2}]O_2$, $LiMnO_2$ and $Al_2O_3$ were mixed to give a nominal stoichiometry Li[Li$_{0.05}$Mn$_{0.37}$Ni$_{0.37}$Co$_{0.14}$Al$_{0.07}$]O$_{2.035}$. The small excess of oxygen does not in practice prevent the powders from reacting during ball milling towards a rock salt type mixed oxide of stoichiometry MO with M=Li$_{0.525}$Mn$_{0.185}$Ni$_{0.185}$Co$_{0.07}$Al$_{0.035}$. FIG. 7A shows the X-ray diffraction pattern after 15 hours ball milling. The peaks in the diffraction pattern are broad indicating very small grains. The crystal structure is mainly a disordered rocksalt type MO, however a small degree of transition metal ordering (probably in a cubic-spinel type structure as known for low temperature LiCoO$_2$) is indicated by the peak at 18.5 deg. 2θ.

The ballmilled powder was subjected to a heat treatment for 24 hours at 800° C. without the need to add additional lithium. The X-ray diffraction pattern of the final material is shown in FIG. 7B. The material has a very small impurity indicated by a small shoulder peak at 43.7 deg. 2θ. However the main phase is a single phase having the desired layered NaFeO$_2$ structure. The hexagonal c-axis is 14.283±0.0015, the a axis is 2.874±0.0002 Å leading to a c:a ratio of 1.0144.

EXAMPLE 7

This example shows that the materials of the present invention are safer than commercial LiCoO$_2$ and Co—Mg—Ti doped LiNiO$_2$. LiCoO$_2$ as well as Co—Mg—Ti doped LiNiO$_2$ are known to be significantly safer than undoped LiNiO$_2$. This example will show that an important benefit of the Mn substitution accompanied by adding Li to the transition metal layers according to the present invention is to obtain cathodes with improved safety properties.

Cathodes were prepared using a commercial LiCoO$_2$ material (BET surface area 0.48 m$^2$/g), a commercial LiNi$_{0.7}$Co$_{0.2}$Ti$_{0.05}$Mg$_{0.04}$O$_2$ with a BET area of 1.9 m$^2$/g and sample 5B of Example 5 (Li[Li$_{0.11}$M$_{0.89}$]O$_2$, M=(Ni$_{1/2}$Mn$_{1/2}$)$_{5/6}$Co$_{1/6}$, with a BET surface area of 1.3 m$^2$/g. To make the cathodes, slurries were prepared by adding a well shaken mixture of super S carbon (70 mg) and 700 mg cathode to a solution comprised of 180 mg Kynarflex copolymer dissolved in 2.2 g dried acetone mixed with 250 mg DBP (Dibuthylpthalate). The slurry was tape-casted on a glass plate using a doctor blade. After drying, the sheet was washed three times in anhydrous ethyl ether to remove the DBP. Then cathode discs were punched. Cells were prepared in the same way as described in Example 3, but EC/DEC in 50/50 ratio was used instead of EC/DMC as the electrolyte solvent.

Cells containing LiCoO$_2$ were charged, discharged and recharged to 4.2 V, cells containing LiNi$_{0.7}$Co$_{0.2}$Ti$_{0.05}$Mg$_{0.04}$O$_2$ were charged to 4.3 and 4.5 V and cells with Li[Li$_{0.11}$M$_{0.89}$]O$_2$, M={Ni$_{1/2}$Mn$_{1/2}$}$_{5/6}$Co$_{1/6}$ were charged to 4.3, 4.4 and 4.5 V. The currents corresponded to a C/15 rate. The cells were held at the upper voltage for approx. 2 hours. The electrochemical charging prior to the DSC measurement is shown in FIG. 8, the charge capacity of the recharge is given in table 7.

The cells were opened in an argon-filled glove box, taking care not to short circuit the cells. The cathodes were removed and dried for approximately 1 minute. Then, half of each cathode was put into small DSC-aluminum cans, which were crimped air tight. The aluminum cans were exported from the glove box and a differential scanning calorimetry (DSC) measurement in flowing argon was made using a ramp of 5 K/min. FIG. 9 shows the results.

All materials show exothermic reactions. Evolution of less exothermic heat at higher temperature indicates improved safety. LiCoO$_2$ and LiNi$_{0.7}$Co$_{0.2}$Ti$_{0.05}$Mg$_{0.04}$O$_2$ show exothermic events at temperatures of T=220–240° C. and T=200–240° C., respectively. The data obtained for the charged LiCoO$_2$ are comparable with data known from literature (D. D. McNeil, J. R. Dahn). The material of the present invention, Li[Li$_{0.11}$M$_{0.89}$]O$_2$ shows a single thermic event at 300 to 320° C., depending on the depth of charge. Even overcharged cathodes (4.5 V) show the first exothermal at a temperature as high as 300° C. Compared with LiCoO$_2$ and LiNi$_{0.7}$Co$_{0.2}$Ti$_{0.05}$Mg$_{0.04}$O$_2$ less heat is evolved at higher temperatures. Results are summarized in table 7. It can be concluded that lithium-rich and manganese substituted materials Li[Li$_x$M$_{1-x}$]O$_2$ have significantly improved safety properties.

TABLE 7

Safety estimation of cathodes

| | Charge to (V) | Charge capacity 2$^{nd}$ cycle (mAh/g) | Onset of exothermic reaction (° C.) | Evolved heat (J/g) |
|---|---|---|---|---|
| Comparative cathodes | | | | |
| LiCoO$_2$ | 4.2 | 148 | 210–225 | 380*, 580** |
| LiNi$_{0.7}$Co$_{0.2}$Ti$_{0.05}$Mg$_{0.04}$O$_2$ | 4.3 | 175 | 220–235 | 360*, 880** |
| LiNi$_{0.7}$Co$_{0.2}$Ti$_{0.05}$Mg$_{0.04}$O$_2$ | 4.5 | 196 | 190–230 | 820** |
| Present invention | | | | |
| Li[Li$_{0.11}$M$_{0.89}$]O$_2$ | 4.3 | 154 | 315 | 120 |
| Li[Li$_{0.11}$M$_{0.89}$]O$_2$ | 4.4 | 165 | 305 | 190 |
| Li[Li$_{0.11}$M$_{0.89}$]O$_2$ | 4.5 | 194 | 300 | >100*** |

*shoulder & first peak
**shoulder & all peaks
***Can exploded

The foregoing description merely explains and illustrates the invention and the invention is not limited thereto except insofar as the appended claims are so limited, as those skilled in the art who have the disclosure before them will be able to make modifications without departing the scope of the invention.

What is claimed is:

1. A single phase cathodic material for use in an electrochemical cell represented by the formula:

wherein $A=[Mn_zNi_{1-z}]$;

wherein x is a numerical value ranging from greater than 0.00 to approximately 0.16;

wherein y is a numerical value ranging from approximately 0.1 to approximately 0.30;

wherein z is a numerical value ranging from approximately 0.40 to approximately 0.65; and wherein $Li_x$ is included in transition metal layers of the structure.

2. The material according to claim 1, wherein the material comprises a layered R-3m crystal structure having a c/a ratio greater than approximately 1.012.

3. The material according to claim 1, wherein x is a numerical value ranging from approximately 0.05 to approximately 0.10.

4. The material according to claim 1, wherein y is a numerical value substantially equal to 0.16.

5. The material according to claim 1, wherein z is a numerical value substantially equal to 0.50.

6. The material according to claim 1, wherein x is a numerical value ranging from approximately 0.05 to approximately 0.10, wherein y is a numerical value substantially equal to 0.16, and wherein z is a numerical value substantially equal to 0.50.

7. A single phase cathodic material for use in an electrochemical cell represented by the formula:

$$Li[Li_xCo_yA_{1-x-y}]O_2$$

wherein $A=[Mn_zNi_{1-z}]$;

wherein x is a numerical value ranging from greater than 0.0 to approximately 0.16;

wherein y is a numerical value ranging from approximately 0.1 to approximately 0.30;

wherein z is a numerical value ranging from approximately 0.4 to approximately 0.65;

wherein $Li_x$ is included in transition metal layers of the structure; and/or wherein the material comprises a layered R-3m crystal structure having a c/a ratio greater than approximately 1.012.

8. The material according to claim 7, wherein x is a numerical value ranging from approximately 0.05 to approximately 0.10.

9. The material according to claim 7, wherein y is a numerical value substantially equal to 0.16.

10. The material according to claim 7, wherein z is a numerical value substantially equal to 0.50.

11. The material according to claim 7, wherein x is a numerical value ranging from approximately 0.05 to approximately 0.10, wherein y is a numerical value substantially equal to 0.16, and wherein z is a numerical value substantially equal to 0.50.

12. An electrode for use in an electrochemical cell, comprising:

a current collector; and a cathodic active material applied to the current collector, wherein the active material is represented by the formula:

$$Li[Li_xCo_yA_{1-x-y}]O_2$$

wherein $A=[Mn_zNi_{1-z}]$;

wherein x is a numerical value ranging from greater than 0.0 to approximately 0.16;

wherein y is a numerical value ranging from approximately 0.1 to approximately 0.30;

wherein z is a numerical value ranging from approximately 0.4 to approximately 0.65; and wherein $Li_x$ is included in transition metal layers of the structure.

13. The electrode according to claim 12, wherein the material comprises a layered R-3m crystal structure having a c/a ratio greater than approximately 1.012.

14. The electrode according to claim 12, wherein x is a numerical value ranging from approximately 0.05 to approximately 0.10.

15. The electrode according to claim 12, wherein y is a numerical value substantially equal to 0.16.

16. The electrode according to claim 12, wherein z is a numerical value substantially equal to 0.50.

17. The electrode according to claim 12, wherein x is a numerical value ranging from approximately 0.05 to approximately 0.10, wherein y is a numerical value substantially equal to 0.16, and wherein z is a numerical value substantially equal to 0.50.

18. An electrochemical cell, comprising:

an electrolyte;

an anodic electrode; and a cathodic electrode, wherein the cathodic electrode includes a current collector and a cathodic active material applied to the current collector, wherein the active material is represented by the formula:

$$Li[Li_xCo_yA_{1-x-y}]O_2$$

wherein $A=[Mn_zNi_{1-z}]$;

wherein x is a numerical value ranging from greater than 0.0 to approximately 0.16;

wherein y is a numerical value ranging from approximately 0.1 to approximately 0.30;

wherein z is a numerical value ranging from approximately 0.4 to approximately 0.65; and wherein $Li_x$ is included in transition metal layers of the structure.

19. The electrochemical cell according to claim 18, wherein the material comprises a layered R-3m crystal structure having a c/a ratio of approximately 1.012.

20. The electrochemical cell according to claim 18, wherein x is a numerical value ranging from approximately 0.05 to approximately 0.10.

21. The electrochemical cell according to claim 18, wherein y is a numerical value substantially equal to 0.16.

22. The electrochemical cell according to claim 18, wherein z is a numerical value substantially equal to 0.50.

23. The electrochemical cell according to claim 18, wherein x is a numerical value ranging from approximately 0.05 to approximately 0.10, wherein y is a numerical value substantially equal to 0.16, and wherein z is a numerical value substantially equal to 0.50.

24. The electrochemical cell according to claim 18, wherein the anodic electrode comprises a lithium intercalation anode.

25. The electrochemical cell according to claim 18, wherein the electrolyte comprises a non-aqueous electrolyte including a lithium salt.

26. A method for manufacturing a single phase cathodic material for use in an electrochemical cell represented by the formula: $Li[Li_xCo_yA_{1-x-y}]O_2$; wherein $A=[Mn_zNi_{1-z}]$;

wherein x is a numerical value ranging from greater than 0.0 to approximately 0.16;

wherein y is a numerical value ranging from approximately 0.1 to approximately 0.30;

wherein z is a numerical value ranging from approximately 0.4 to approximately 0.65; and wherein $Li_x$ is included in transition metal layers of the structure, and/or wherein the material comprises a layered R-3m crystal structure having a c/a ratio greater than approximately 1.012, the method comprising the steps of:

providing a precursor with a mixture of Ni, Mn and Co cations;

mixing the precursor with a stoichiometric amount of a Li source; and reacting the resulting mixture at an elevated temperature.

27. The method according to claim 26, wherein the step of providing a precursor includes the step of providing a mixed metal hydroxide.

28. The method according to claim 26, wherein the step of providing a precursor includes the step of providing a mixed metal hydroxide prepared from co-precipitation of a solution containing a mixture of Ni, Mn, and Co.

29. The method according to claim 26, wherein the step of providing a precursor includes the step of providing a mixed metal oxide represented by the formula: $M_3O_4$; wherein M is a combination of Ni, Mn, and Co.

30. The method according to claim 26, wherein the step of providing a precursor includes the step of providing a mixed metal oxide represented by the formula: MO, wherein M is a combination of Ni, Mn, and Co.

31. The method according to claim 26, wherein the step of providing a precursor includes the step of providing a mixed metal oxide represented by the formula: $Li_xMO_2$, wherein M is a combination of Ni, Mn, and Co and wherein x is approximately 1.

32. The method according to claim 26, wherein the step of providing a precursor includes the step of heating the precursor in an oxygen containing atmosphere at a temperature ranging from approximately 500° C. to approximately 1,000° C.

33. The method according to claim 26, wherein the step of providing a precursor includes the step of heating the precursor in an oxygen containing atmosphere at a temperature ranging from approximately 900° C. to approximately 1,000° C.

34. The method according to claim 26, wherein the reaction at elevated temperature is carried out for at least 12 hours.

35. A method for manufacturing a single phase cathodic material for use in an electrochemical cell represented by the formula: $Li[Li_xCo_yA_{1-x-y}]O_2$; wherein $A=[Mn_zNi_{1-z}]$;

wherein x is a numerical value ranging from greater than 0.0 to approximately 0.16;

wherein y is a numerical value ranging from approximately 0.1 to approximately 0.30;

wherein z is a numerical value ranging from approximately 0.4 to approximately 0.65; and wherein $Li^x$ is included in transition metal layers of the structure, and/or wherein the material comprises a layered R-3m crystal structure having a c/a ratio greater than approximately 1.012, the method comprising the steps of:

mixing powders of metal oxides, wherein the metal oxides includes Ni, Mn, and Co, and Li;

ball milling the mixture to produce a precursor oxide; and heating the precursor oxide.

36. The method according to claim 35, wherein the step of mixing powders of metal oxides includes the step of mixing powders of metal oxides such that the total lithium and oxygen content has substantially the stoichiometry required in the final lithiated oxide material.

37. The method according to claim 35, wherein the step of heating the precursor oxide occurs in an oxygen containing atmosphere at a temperature ranging from approximately 500° C. to approximately 1,000° C.

38. The method according to claim 35, wherein the step of heating the precursor oxide occurs in an oxygen containing atmosphere at a temperature ranging from approximately 900° C. to approximately 1,000° C.

39. The method according to claim 35, wherein the reaction at elevated temperature is carried out for at least 12 hours.

* * * * *